United States Patent [19]

Thomas et al.

[11] Patent Number: 4,488,876
[45] Date of Patent: Dec. 18, 1984

[54] AIMPOINT PROCESSOR FOR QUANTIZING TARGET DATA

[75] Inventors: Daniel L. Thomas, Manchester; John J. Poetker, Clarksville, both of Md.

[73] Assignee: The United States of America as represented by the Secretary of the Navy, Washington, D.C.

[21] Appl. No.: 362,350

[22] Filed: Mar. 26, 1982

[51] Int. Cl.³ .............................................. F41G 3/26
[52] U.S. Cl. ..................................................... 434/20
[58] Field of Search ....................... 434/19, 20, 43, 44

[56] References Cited

U.S. PATENT DOCUMENTS

| | | |
|---|---|---|
| 3,798,795 | 3/1974 | Michelsen ............................. 434/19 |
| 4,001,499 | 1/1977 | Dowell ................................... 434/43 |
| 4,078,317 | 3/1978 | Wheatley et al. ..................... 434/43 |
| 4,302,191 | 11/1981 | Weibull ................................. 434/20 |
| 4,368,517 | 1/1983 | Lovering ............................... 434/43 |

*Primary Examiner*—Richard C. Pinkham
*Assistant Examiner*—Leo P. Picard
*Attorney, Agent, or Firm*—Robert F. Beers; Kenneth E. Walden

[57] ABSTRACT

A data processor system for extracting and quantizing aimpoint data from a stored video display of a target tracking operation comprising an operator-controlled joystick by which an operator can superimpose, on a frame-by-frame basis, distinctive display symbols coincident with the aimpoint of the target tracking system and a selected target reference point. The processor includes a programmable calculator which converts the angular separation of the tracking and target reference points into corresponding linear (x, y) data coordinates and then automatically plots the aimpoint from successive display frames on a target silhouette. The programmable calculator also is able to perform a coordinate rotation in order to compensate for angular displacement between the orientation of the tracking system and the target, e.g. to compensate for roll of the aircraft on which a radar tracker is mounted.

9 Claims, 4 Drawing Figures

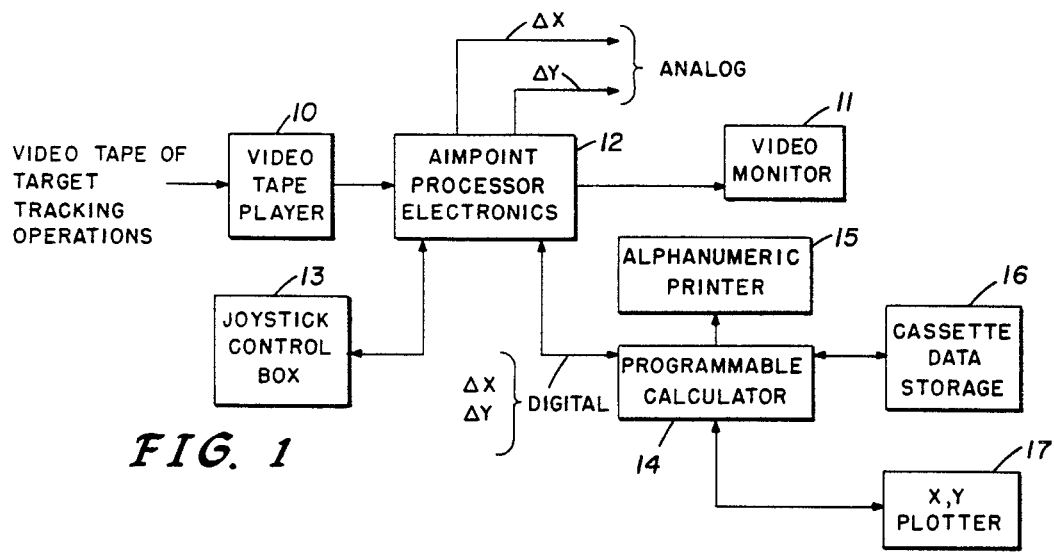
FIG. 1
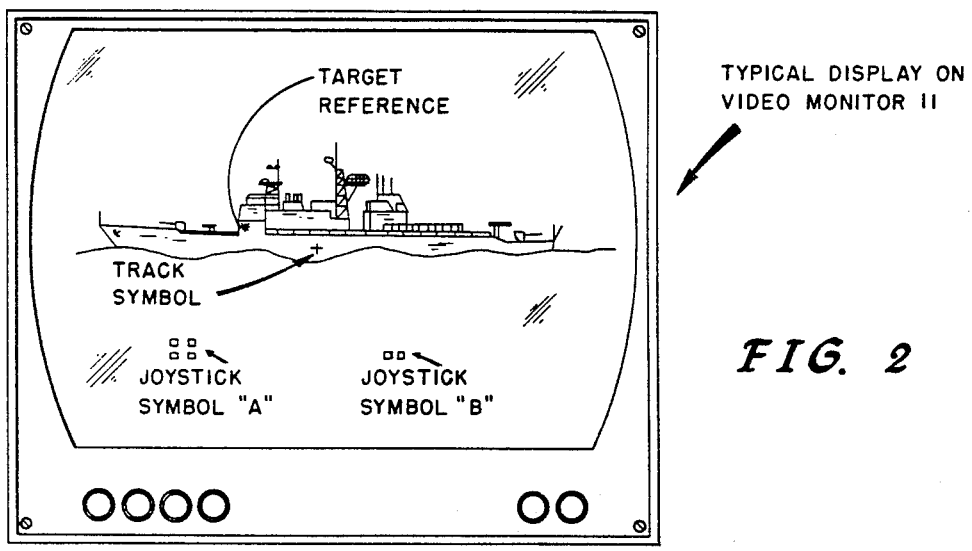
TYPICAL DISPLAY ON VIDEO MONITOR 11
FIG. 2
TYPICAL OUTPUT PLOT FROM PLOTTER 17
FIG. 3
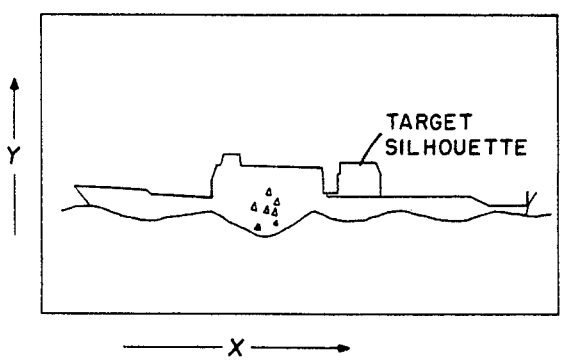

PROCESSOR ELECTRONICS 12

AIMPOINT PROCESSOR FOR QUANTIZING TARGET DATA

BACKGROUND OF THE INVENTION

During recent years, television systems have been adapted to target tracking systems (e.g. radar) to provide visual tracking data which indicate the operational performance of the target tracking system. One such television system is described in Technical Memorandum TG-1157 (April 1971) of The Johns Hopkins University/Applied Physics Laboratory.

Basically, a high-resolution television camera is aligned with the radar tracking antenna so that the resulting television image is indicative of the track or aimpoint performance on or about the target being tracked. A track symbol inserted electrically into the television image represents the aimpoint of the tracking radar; the track symbol's position being controlled, for example, either by processed angle error information derived from the radar angle tracking gates or by radar antenna position voltages from potentiometers directly coupled to the antenna. The television image (with superimposed track symbol) is then typically recorded on video tape(s) and subsequently played back for the purpose of evaluating performance of the target tracking system.

A somewhat related system for evaluating the aim of a missile firing system is disclosed in U.S. Pat. No. 3,798,795 to P. F. Michelsen, wherein a data processing unit compares weapons aim data against actual target flight path data (derived from a television system and radar ranging) and known missile ballistics to determine accuracy of weapons aiming. The television system makes use of a light source mounted on a target plane as a reference, to determine actual target location; the position of the light image relative to the center of the television display being determined by circuitry responsive to the television scanning trace.

SUMMARY OF THE INVENTION

The present invention provides a simple and efficient system for extracting and quantizing; e.g. for X, Y plotter control, aimpoint data from a stored video display of a target tracking operation. The proposed system is particularly adapted to enable semi-skilled operators to extract aimpoint data from video tapes containing the target tracking data and to plot and store the extracted data for further processing and analysis.

The system of the present invention receives the stored video display of a target tracking scenario (e.g. from video data tape inputs) and displays it on a television monitor with two joystick-controlled symbols superimposed. The operator views the input target tracking display on a still frame basis and positions one joystick symbol to coincide with the original (radar) track symbol contained on the input video image and the other joystick symbol to coincide with any selected prominent reference point feature of the target. The proposed system thereby measures the angular separation of the original track symbol from the target reference point. This angular separation data are entered by the operator, frame-by-frame, into a calculator unit which converts the angular separation into X, Y linear displacement data which are available for storage on cassette tape and for controlling the operation of an X, Y plotter to plot each entered aimpoint on an appropriate target silhouette. If desired, the X, Y linear displacement data are corrected to compensate for changes in relative displacement between the field of view of the radar tracker and the target, e.g. to compensate for roll of an aircraft upon which the radar tracker is mounted.

In view of the foregoing discussion, one object of the present invention is to provide a simple and efficient system for extracting and quantizing aimpoint data from a stored video display of a target tracking senario.

Another object of the present invention is to enable a semi-skilled operator to extract aimpoint data from input video data tapes of a target tracking operation and to plot and store the results for further processing and analysis.

Other objects, purposes and characteristic features of the present invention will, in part, be pointed out as the description of the preferred embodiment progresses and, in part, be obvious from the accompanying drawings, wherein:

FIG. 1 is a block diagram of the aimpoint data processing system comprising the present invention;

FIG. 2 illustrates a television image generated in accordance with the present invention and depicting a typical target tracking scenario frame with a pair of joy-stick-controlled symbols superimposed thereon;

FIG. 3 illustrates an X, Y plot generated in accordance with the present invention and depicting the distribution from frame to frame of the target tracking system aimpoint on a target silhouette.

Figure 4:
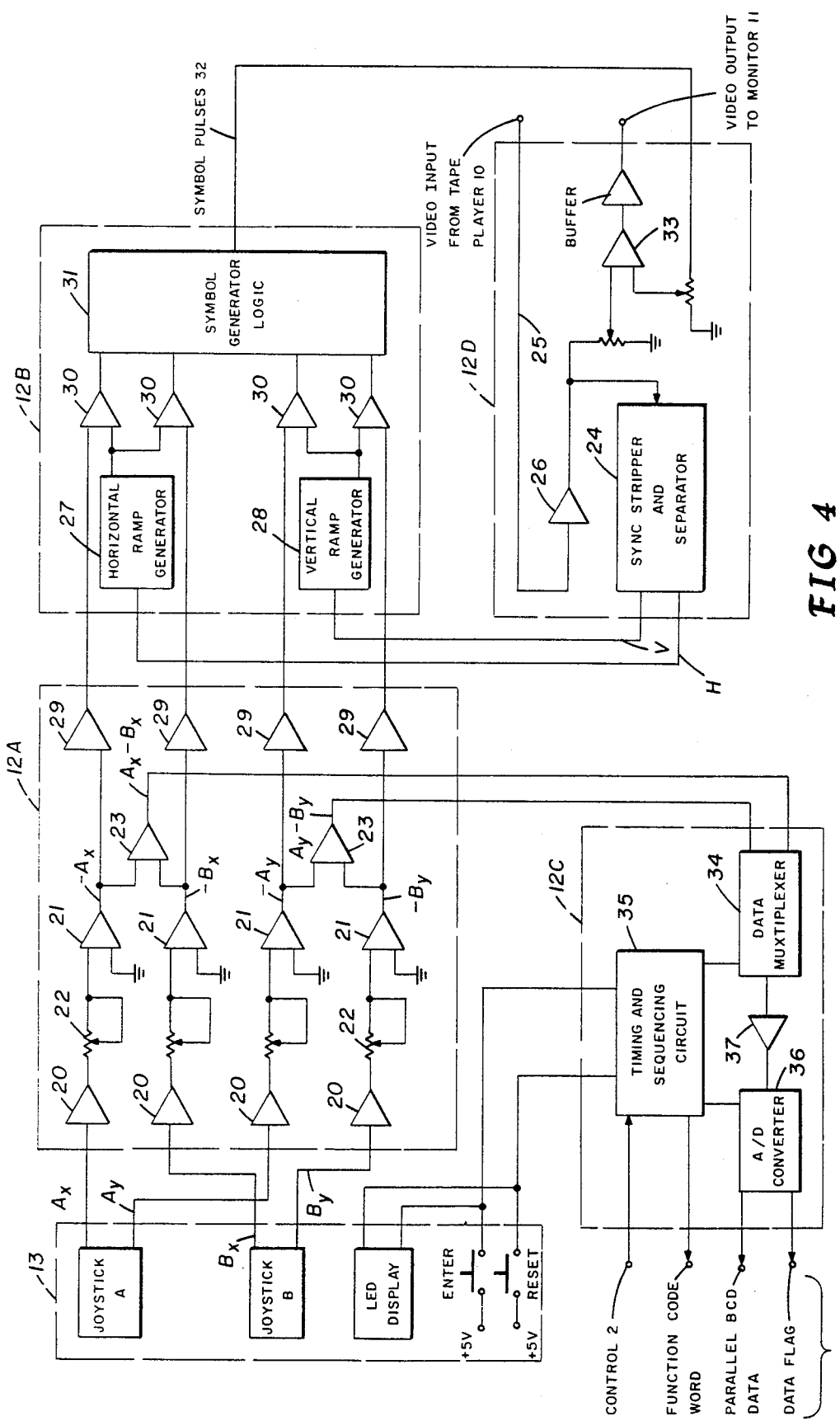
FIG. 4 is a detailed block diagram of the preferred embodiment of the proposed aimpoint data processing system.

The overall structure of the proposed aimpoint processing system is illustrated in FIG. 1 of the drawings and comprises a video tape player 10, a television monitor unit 11, aimpoint processor electronic circuitry 12, a joystick control box 13, and a programmable calculator 14. The programmable calculator 14 may be connected to various peripheral devices, such as the illustrated alphanumeric printer 15, cassette data storage 16 and X, Y plotter 17.

The video tape player 10 is of conventional design; e.g. a Sony EV-320F, and receives the input video tape(s) containing storage of the target tracking operation recorded by a television system whose field of view is aligned with the target tracking (radar) system, as discussed previously. The video image output from the tape player 10 is applied to the aimpoint processor circuitry 12, to be described hereinafter, where two joystick-controlled symbols are superimposed in response to the operator's actuation of control box 13. The video monitor 11 thus displays typically (see FIG. 2) a television image of the target tracking scenario, with the original radar track symbol (shown in the form of an "+" in FIG. 2) and the two joystick symbols A and B (shown in the form of four and two square dot patterns respectively in FIG. 2). A target reference point, corresponding to a preselected prominent structural feature of the target; e.g. the leading edge of the target ship's super-structure, is also designated in FIG. 2.

The operator views the input video display on a still frame basis and positions one joystick symbol (symbol "A") to coincide with the radar track symbol (at "+" in FIG. 2) and the other joystick symbol (symbol "B") to coincide with the target reference point. As will be described hereinafter, the aimpoint processor circuitry 12 then measures the angular separation between the track symbol or aimpoint and this reference point. On a cue from the operator, the calculator 14 reads this separation value and converts it into linear (X, Y) displacement data values. By way of example, in one practical application of the proposed aimpoint processor system, the Hewlett-Packard HP-9810A programmable desk-top calculator is utilized to (a) convert angular display separation into linear displacement, (b) correct for roll of the aircraft which carries the track radar, (c) store the displacement data on cassette tape (unit 16 in FIG. 2) and (d) plot (on X, Y plotter 17) the aimpoints, frame-by-frame, on a target silhouette. FIG. 3 illustrates a typical X, Y silhouette plot of the tracking system aimpoints (each represented in FIG. 3 by a triangular dot) corresponding to a selected series of frames of the input television image. In addition to the above-functions, the calculator 14 can be used, if desired, to compute the mean value of all aimpoints entered for a given target tracking run, as well as the variance of each aimpoint from such mean.

The calculator 14 and its peripherals are controlled by a software routine written so that a relatively inexperienced operator can control the aimpoint processor system; i.e. once the program is loaded into the calculator 14, the operator need only follow the messages presented to him on the alphanumeric printer 15. These messages will lead the operator to the point of positioning the joystick symbols, as described above, and initiating digitizing of the displacement data ($\Delta X$, $\Delta Y$ of the aimpoint relative to the reference point) and reading of such digital $\Delta X$, $\Delta Y$ data into the calculator 14.

Appendix A contains a complete listing of the data register assignment and operating program for implementing calculator 14 with a Hewlett-Packard HP-9810A programmable desk-top calculator containing 109 numbered data registers (see Table A-1 of Appendix A). The program is contained in three cassette files (designated files 0, 1 and 2 in Appendix A), each containing, for example, 250 registers which provide a capacity of 2000 program steps per file. Each file listing shown in Appendix A utilizes conventional program notation for the HP-9810 calculator; file 0 containing a list of the program contents [see Table A-2 of Appendix A for the various operations (labelled A through P and S) made available to the user-operator]; file 1 containing program segments-Labels A through N; and, file 2 containing Labels O, P and S. To operate the program, the operator loads file 0, selects the desired Label and then follows the program cues displayed e.g. at printer 15.

As noted in Table A-1, registers 000 to 005 contain the statistics values used to compute the aimpoint mean and variance; registers 021 to 024 also contain statistics values (but are not used in the program); and, registers 025 and 026 contain the coordinates (e.g. in feet) of the "B" joystick reference (target reference point in FIG. 2). Registers 030 to 099 contain the values used to compute the coordinate system rotation for horizontal adjustment (to compensate for change in the relative orientation of the target system's field of view); i.e. registers 030 to 090 contain the indicated data points and registers 091 to 098 contain the indicated input parameters. Register 100 counts the total number of data points contained in this file (and all previous files), while registers 102 to 108 contain the scaling parameters for X, Y plotter 17 (see FIG. 1).

After reading each displacement data value, the calculator 14 performs a number of operations before it is prepared to read the next. The first operation is the computation of the target range. Range values are computed, as will be described hereinafter, from data entered by the operator at the start of the routine. The data consist of the target range at the start of the run, the range at the end, the run duration, and the data sample rate.

The calculator 14 reads the displacement data in a coordinate system centered on the target reference point (see FIG. 2) with the X-axis parallel to the local horizon and the horizon on the video display. If the tracking aircraft rolls during the run, the horizon on the TV display is no longer parallel to the X-axis. Consequently, the calculator 14 performs a coordinate rotation on the data, as will be described later, to place it in the correct coordinate system.

The target reference point for each aimpoint run is chosen primarily for convenience; in general, it will differ from run to run. However, it is preferable to have all the aimpoint data with a standard reference point independent of target type and aspect. The calculator 14 must simply perform a linear translation of the data from the present coordinate system to one centered on the standard reference. First, the aimpoint data is converted from an angular displacement to a linear displacement by multiplying $\Delta X$ and $\Delta Y$ by the computed range value. The calculator 14 then performs the translation.

Finally the aimpoint data is in the desired form. When 20 aimpoints have accumulated in the calculator 14, the memory is unloaded onto the cassette tape 16 for permanent storage. The aimpoint is also plotted, at 17, on a silhouette of the target. The plotter 17 places a single dot at the position of the aimpoint. When the run is complete the silhouette will have a number of points on it that represents the spatial distribution of the seeker aimpoints (see FIG. 3 for example).

The calculator 14 continues reading the aimpoints until the end range is reached. If desired, it can then compute the mean of all the aimpoints from the current run and place a cross or other distinctive mark at the location of the mean on the target silhouette.

Upon completion of the run, the operator can continue with the next run or produce additional plots from the data stored on the cassette tape. The software contains subroutines for plotting azimuth or elevation angular displacement versus range or time, azimuth or elevation linear displacement versus range or time, the running mean, and the spatial plot of the aimpoints as plotted during the run. In addition, a list of the data, the mean, and the variance can be generated on the printer 15.

Referring now to FIG. 4 of the drawings, the illustrated processor electronics 12 are contained on four plug-in cards: namely, joystick-position voltage generator 12A; voltage-controlled symbol generator 12B; calculator interface 12C; and, sync stripper and video mixer 12D.

The voltage generator card 12A is connected to receive two position voltages from each of the joysticks (designated A and B in FIG. 4); i.e., one voltage proportional to the X-axis position and the other proportional to the y-axis position of the associated joystick. First, the four position voltage signals are buffered at 20 to assure isolation between the joysticks and the scaling amplifiers 21. Then the signals are amplified and offset at 21 to provide the scaled joystick voltages ($A_x$, $-A_y$, $B_x$, and $-B_y$). These voltages are scaled so that 1 V equals 1° with a range of $\pm 2.500°$ horizontally, and $\pm 1.875°$ vertically (x-axis and y-axis, respectively). The joystick range corresponds to the angular field of view on the TV monitor 11. The joystick voltages are preferably checked periodically and readjusted if necessary to assure maximum accuracy. Potentiometers, such as those indicated at 22, independently control the offset and gain of the four scaling amplifiers 21.

In normal operation, the scaled voltages $-A_x$ and $-A_y$ are subtracted from $-B_x$ and $-B_y$ at differential amplifiers 23 to produce $A_x-B_x$ and $A_y-B_y$. These are the coordinate values of the position of joystick A in a rectilinear coordinate system with joystick B defining the origin. A conventional selector switch on the control box 13 can be used to select either the normal mode, an A Only mode or a B Only mode. The latter two positions are not used in normal operation, but can be used during joystick calibration procedure to check the offset and range of the scaled joystick voltages independently. In the A Only position, for example, the joystick B voltages are set to 0 so only $A_x$ and $A_y$ are output. Likewise, in the B only position, the joystick A voltages are set to 0 and only $-B_x$ and $-B_y$ are output.

In order to operate the processor, the scaled joystick voltages $A_x$, $A_y$, $B_x$ and $B_y$ are controlled by the operator to move symbols "A" and "B" (see FIG. 2) about on the video display. These symbols are generated by first coupling a portion of the composite video from the video tape player 10 into the sync stripper and separator 24, via line 25 and buffer 26 on card 12D in FIG. 4. The sync stripper 24 removes the horizontal (H) and vertical (V) synchronizing pulses from the composite video signal to produce the composite sync signal devoid of video modulation. At circuit 24, the sync separator operates on the composite sync to produce the H and V sync pulses on separate lines connected to card 12B.

The horizontal and vertical ramp generators 27 and 28 use the H and V pulses respectively as triggers to start and stop positive-going ramps. The ramps begin on the trailing edge of the sync pulses and end on the leading edge. Therefore, the vertical ramp generated at 28 begins at the top of the video display and ends at the bottom at a 60-Hz rate while the horizontal ramp generated at 27 starts on the left and ends on the right at a 15.75-kHz rate. The amplitude and offset of the ramps are adjusted, e.g. by suitable potentiometers, to match the scaled joy-stick voltage ranges ($\pm 2.500$ and $\pm 1.875$ volts for H and V, respectively).

The ramp voltage signals from generators 27 and 28 and the scaled joystick voltages $A_x$, $A_y$, $B_x$ and $B_y$ (applied through buffers 29) are compared at comparators 30. The comparators 30 each output a pulse when the ramp level and the scaled joystick voltage are equal. The comparator pulses are used in the symbol generator logic 31 (to be described) to form a combination of pulses that is applied over line 32 to card 12O where the symbol pulses are mixed with the composite video, at mixer 33, to form the joystick symbols. Since the ramps and the joysticks are linear, there is a one-to-one correspondence between the joystick position and the position of the corresponding symbol on the video display.

As will be described hereinafter, when the joystick symbols "A" and "B" are moved about on the video display; i.e. are positioned at the radar track symbol and target reference point respectively, the processor continuously computes $A_x-B_x$ ($\Delta X$) and $A_y-B_y$ ($\Delta Y$). These voltages are available at the data multiplexer 34 on the calculator interface card 12C in FIG. 4. When the operator is ready to output a measurement to the HP 9810A calculator 14, he presses the Enter button on the control box 13, which starts the following sequence of events. First, the timing and sequencing circuit 35 is initialized, then the data multiplexer 34 is switched to pass $\Delta X$ to the A/D converter 36 via buffer 37. When the A/D converter 36 completes conversion, it sends a data flag pulse to the calculator 14. The calculator 14 begins reading the parallel BCD data (13 bits) on the output of the A/D converter 36. As soon as the calculator 14 finishes reading the data, it signals the sequencing circuit 35 on the Control 2 line and the data multiplexer 34 is switched to $\Delta Y$. The same sequence follows for $\Delta Y$. The sequencing circuit 35 outputs a 4-bit function code word which uniquely defines which data channel is active in the data multiplexer 34. The calculator 14 uses this word to identify the data.

When Enter is pressed, it also increments a conventional 3-decimal-digit LED display on the control box 13 to inform the operator how many data points have been sampled. The display can be reset to zero by pressing the Reset button, which also manually resets the timing and sequencing circuit 35.

The HP 9810A calculator 14 is a general-purpose programmable desk-top calculator. In the proposed aimpoint processor system of the present invention, the calculator 14 reads and processes the digital joystick voltages when cued from the control box 13, as previously described, and stores and plots the results under control of the program listed in Appendix A. More specifically, calculator 14 is programmed with a keyboard language that uses one keystroke for one program step. The calculator program memory can store up to 2036 steps. The keys include most of the normal mathematical operations, statistical operations (e.g., mean and variance), keys to store and retrieve data, programming keys, and several special-purpose keys to control peripherals.

As discussed above, the calculator 14 contains 109 data storage registers (000 to 108), assigned as shown in Table A-1. It also contains 3 display registers (X, Y, Z), and 2 temporary registers (A, B). Data can be stored and/or retrieved from any of the registers by keyboard or program. A data word consists of 12 decimal digits, sign, exponent, and exponent sign. Each register can hold one word. The HP9810A calculator preferred, at 14, has a built-in thermal-paper printer. During programming operations, the printer can be used to list the program (Appendix A) or can be programmed to output messages to an operator during program execution. In addition it can list data during input operations or from the data storage registers. Moreover, the versitility of the HP 9810A calculator is increased by the associated 11203A BCD interface peripheral. This is a card that plugs into the rear of the calculator 14 and enables the calculator 14 to read parallel BCD data from an external source. The BCD data word can have up to nine decimal digits, polarity, exponent, exponent sign, an over-range indicator, and a function code to identify the word. In the proposed application, the aimpoint processor outputs only the three least significant decimal digits, polarity and the function code, and therefore the remainder of the word is set to zeros.

The programmed data-read command causes the 11203A interface to output a falling edge on a control line (Control 2 in FIG. 4), which indicates to the processor 12 that the calculator 14 is ready to read data. The processor 12 must output a rising edge on another control line (denoted at DATA FLAG in FIG. 4) to indicate that the calculator 14 can begin reading the data. The reading process involves converting the BCD data to ASCII format, storing the function code in the Y display register and the data in X. The data are manipulated by the aimpoint processor program then stored in one of the numerical registers (000 to 100). The quantity of data from a typical aimpoint run exceeds the memory capacity of the calculator 14. Therefore, the data from the numerical registers are recorded periodically on cassette tape, e.g. 20 data points at a time; in cassette storage unit 16, such as an HP 11265A.

The cassette memory in unit 16 allows data or programs to be stored external to the calculator 14 and then to be transferred into the calculator 14 on request from the keyboard or program. The capacity of each cassette is either 6000 data words or 48000 program steps. The cassette tape is divided into files with numerical designations for ease in locating information. Files are limited in size to the data or program capacity of the calculator 14. Therefore, a file can hold either 108 data words or 2036 program steps and must be designated as either a data file or a program file, but not both.

After each data word is stored, it is also plotted on the plotter 17 in a manner that enables the joystick operator to evaluate the accuracy of the aimpoint process on a real-time basis. The plotter 17 is also used to plot the data from the cassette tape in various formats for analysis. It can plot straight lines, curves of short straight line segments, and can print alphanumerics. The plotter 17 can plot any point that falls within the coordinate system boundaries set into the calculator 14. These and other plotter-related parameters are stored in numerical registers 101 to 108 (see Table A-1), which precludes their use as data storage.

DATA-TAKING PROCEDURE

The aimpoint program (Appendix A) is loaded into the calculator 14 to start the aimpoint data acquisition process. As noted earlier, the program is contained in three cassette files (files 0, 1, and 2). Each file contains 250 registers, giving a capacity of 2000 program steps per file. Only file 1 is filled to capacity; the other two contain space for program growth. Each aimpoint data tape contains the three program files.

File 0 is loaded first and the program is executed. This segment lists the program name and the operations available to the user (Table A-2). Each operation has an alphabetical label associated with it. When the calculator 14 is instructed to go to a certain label, it goes to the point in the program where that operation begins (e.g., the routine for plotting the azimuth angles in degrees versus time begins at Label J). There are 14 operations in file 1 (Labels A to N) and 3 in file 2 (Labels O, P, and S). As soon as the operation listing is complete in file 0, then file 1 is immediately loaded. The operator then chooses the operation he wishes.

The aimpoint processor 12 reads the data from the video tape input 10 under control of Label A, the routine for reading and plotting the data on the target silhouette; i.e. the correct target silhouette are adjusted, so that plotting occurs within a restricted area. Next Label A is executed (see Appendix B for Label A flow chart) and the calculator 14 begins making requests for information which the operator supplies.

As shown in Appendix B, the calculator 14 first requests the values $X_{min}$, $X_{max}$, $Y_{min}$, and $Y_{max}$, which define the numerical values of the plotting surface limits. These values (in feet) properly scale the silhouette. Next, the calculator 14 requests the coordinates of the point on the target to be used as a reference ($X_{ref}$, $Y_{ref}$). This point is found by measuring the horizontal and vertical distance of the reference from the coordinate system center. Then the calculator 14 requests the starting range ($R_{max}$), the end range ($R_{min}$), the duration of the run (T), the operation number, the run number and the sample rate (S).

When these values are entered, the calculator 14 informs the operator to start the input video tape 10 (at the correct field in still frame) and press the Reset button on the control box 13 to initialize the processor. The calculator 14 immediately prints the message "Place symbols on horizontal, press Enter". The operator places the joystick symbols "A" and "B" (see FIG. 2) on some line in the TV display horizontal, such as the horizon or the waterline on the target. After pressing Enter, the calculator 14 reads the coordinates of the "A" and "B" symbols and computes the angle of rotation of the target horizon to the local horizon (the X-axis) by the following relations:

$$\sin \alpha = \frac{\Delta Y}{\Delta X^2 + \Delta Y^2},$$

and $$\cos \alpha = \frac{\Delta X}{\Delta X^2 + \Delta Y^2},$$

where $\alpha$ is the rotation angle. This angle is required so that all the aimpoint data can be rotated through it and plotted on the silhouette (which cannot be rotated to match the target). The coordinate rotation routine is found in subroutine Label U which is called by the program before the first data point and every 0.9 s (TV time) thereafter to compensate for changes in the target orientation. The rotated coordinates are computed by the following equations:

$$\Delta X^1 = \Delta X \cos \alpha + \Delta Y \sin \alpha, \text{ and}$$

$$\Delta Y^1 = \Delta Y \cos \alpha - \Delta X \sin \alpha,$$

where ($\Delta X^1$, $\Delta Y^1$) are the rotated coordinates.

Next, with reference to FIGS. 2 and 4, the operator aligns joystick symbol "A" on the radar track symbol and symbol "B" on the target reference and presses Enter on control box 13. The $\Delta X$ and $\Delta Y$ values are read, rotated to the silhouette horizontal, converted to linear displacements, translated to the stern waterline coordinate system, and stored in the calculator data memory. Specifically, the $\Delta X$ and $\Delta Y$ angles are converted to displacements on the target by multiplying the computed target range (in feet) times the angular displacement (in radians). The target range is computed for each sample by the equation $$R_n = R_{max} - \frac{n(R_{max} - R_{min})}{ST},$$

where
$R_{max}$ is the run starting range (in feet),
$R_{min}$ is the run ending range (in feet),
T is the run duration (in seconds),
S is the sample rate (in samples/second), and
n is the sample number.

A point is then plotted, at 17, on the silhouette at the location of $\Delta X$ and $\Delta Y$. In addition, the $\Delta X$ and $\Delta Y$ values (in feet) are statistically summed for later computation of the mean. During the data run, the operator can assure that the plotted points on the target silhouette correspond to the position of the radar track symbol by observing the TV display on monitor 11 (see FIG. 2).

Before reading more data, two decisions are made in the program (see Appendix B). First, is the current range less than $R_{min}$? If not, the program determines if 20 data points are currently in memory. If there are not 20 points in memory, the program goes back to read more data. If there are, the data are stored on the cassette, at 16, and the program returns to read more data, storing the new data in place of the old in memory.

When the range reaches $R_{min}$, the program jumps to Label W, which stores the data points currently in memory on the cassette. The program then commands the plotter 17 to title the target silhouette, store the last data file number in all the data files, and plot the mean of the data on the silhouette (e.g. in red). The run is then complete.

If for some reason the operator wishes to interrupt the run, Label B is available for the purpose. The operator should stop at a field in which the TV time code has just changed to the next whole second (this time must be noted). Label B (see upper flow chart of Appendix C) prints the number of the first data file then stores the data currently in memory on the cassette. All of the equipment can be turned off at this point without losing data.

To continue the interrupted run the operator goes to Label C (lower flow chart in Appendix C). The routine begins with a jump to subroutine Label X, which locates and loads the first data file. The routine converts each data point in turn to a displacement in feet and performs the statistical sum. This continues until the last data point is reached. The program back-spaces the cassette so it is correctly positioned at the beginning of the last, unfilled data file. It then requests the values of $X_{ref}$ and $Y_{ref}$ which were erased when the run was interrupted. A message is printed telling the operator to start the video tape (at the correct field) and press Reset on the control box 13. When the program continues, a horizontal setting is requested and the routine continues in Label A.

A terminate routine is available that allows the operator to terminate the run prior to reaching $R_{min}$. This routine, Label D, merely calls Label W after modifying the data locator register. Then the plot is titled and all the data are recorded.

Various modifications, adaptations and alterations to the illustrated embodiment of the proposed aimpoint processor are of course possible in light of the above teachings. Therefore, it should be understood at this time that within the scope of the appended claims, the invention may be practiced otherwise than as specifically described.

TABLE A-1

Data Register Assignments

| | | | | | |
|---|---|---|---|---|---|
| 000 | n | 046 | $\Delta X_6$ | 078 | R16 |
| 0001 | $\Sigma x$ | 047 | $\Delta Y_6$ | 079 | $\Delta X_{17}$ |
| 002 | $\Sigma x^2$ | 048 | $R_6$ | 080 | $\Delta Y_{17}$ |
| 003 | $\Sigma y$ | 049 | $\Delta X_7$ | 081 | $R_{17}$ |
| 004 | $\Sigma xy$ | 050 | $\Delta Y_7$ | 082 | $\Delta X_{18}$ |
| 005 | $\Sigma y^2$ | 051 | $R_7$ | 083 | $\Delta Y_{18}$ |
| 006-020 | | 052 | $\Delta X_8$ | 084 | R18 |
| not used | | 053 | $\Delta Y_8$ | 085 | $\Delta X_{19}$ |
| 021 | $X_{min}$ | 054 | $R_8$ | 086 | $\Delta Y_{19}$ |
| 022 | $X_{max}$ | 055 | $\Delta X_9$ | 087 | $R_{19}$ |
| 023 | $Y_{min}$ | 056 | $\Delta Y_9$ | 088 | $\Delta X_{20}$ |
| 024 | $Y_{max}$ | 057 | $R_9$ | 089 | $\Delta Y_{20}$ |
| 025 | $X_{ref}$ | 058 | $\Delta X_{10}$ | 090 | $R_{20}$ |
| 026 | $Y_{ref}$ | 059 | $\Delta Y_{10}$ | 091 | $R_{max}$ |
| 027-029 | | 060 | $R_{10}$ | 092 | $R_{min}$ |
| not used | | 061 | $\Delta X_{11}$ | 093 | Run Time |
| 030 | $\cos \theta$ | 062 | $\Delta Y_{11}$ | 094 | OP No. |
| 031 | $\Delta X_1$ | 063 | $R_{11}$ | 095 | Run No. |
| 032 | $\Delta Y_1$ | 064 | $\Delta X_{12}$ | 096 | Starting File |
| 033 | $R_1$ | 065 | $\Delta Y_{12}$ | 097 | End File |
| 034 | $\Delta X_2$ | 066 | $R_{12}$ | 098 | Sample Rate |
| 035 | $\Delta Y_2$ | 067 | $\Delta X_{13}$ | 099 | $\sin \theta$ |
| 036 | $R_2$ | 068 | $\Delta Y_{13}$ | 100 | Data point counter |
| 037 | $\Delta X_3$ | 069 | $R_{13}$ | 101 | Buffer |
| 038 | $\Delta Y_3$ | 070 | $\Delta X_{14}$ | 102 | User-specified alpha scale factor |
| 039 | $R_3$ | 071 | $\Delta Y_{14}$ | | |
| 049 | $\Delta X_4$ | 072 | $R_{14}$ | 103* | Y Scaled |
| 041 | $\Delta Y_4$ | 073 | $\Delta X_{15}$ | 104* | X Scaled |
| 042 | $R_4$ | 074 | $\Delta Y_{15}$ | 105 | $Y_{min}$ |
| 043 | $\Delta X_5$ | 075 | $R_{15}$ | 106 | $Y_{max}$ |
| 044 | $\Delta Y_5$ | 076 | $\Delta X_{16}$ | 107 | $X_{min}$ |
| 045 | $R_5$ | 077 | $\Delta Y_{16}$ | 108 | $Y_{max}$ |

*Current scaled pen coordinates

TABLE A-2

Aimpoint Program Contents

| OPERATION | GO TO LABEL |
|---|---|
| ENTER AND PLOT ON TGT | A |
| INTERRUPT RUN | B |
| CONTINUE RUN | C |
| TERMINATE RUN | D |
| PLOT ON TGT | E |
| PLOT VS. RANGE | |
| AZ ANGLE(DEG) | F |
| AZ ANGLE(FT) | G |
| EL ANGLE(DEG) | H |
| EL ANGLE(FT) | I |
| PLOT VS. TIME | |
| AZ ANGLE(DEG) | J |
| AZ ANGLE(FT) | K |
| EL ANGLE(DEG) | L |
| EL ANGLE(FT) | M |
| PLOT RUNNING MEAN ON TGT | N |
| LIST | |
| MEANS(FT) | O |
| DATA(FT) | P |
| CORRECTIONS | S |

Aimpoint Program - File 0

```
0000--FMT---42    0057--CNT---47    0114--CNT---47    0171--CNT---47
0001--FMT---42    0058--CNT---47    0115-- O ---71    0172-- α ---13
0002--CLR---20    0059--CNT---47    0116-- N ---73    0173--1/X---17
0003--CNT---47    0060--CNT---47    0117--CNT---47    0174-- N ---73
0004--CNT---47    0061--CNT---47    0118--XTO---23    0175-- - ---34
0005-- M ---70    0062-- G ---15    0119-- G ---15    0176-- - ---34
0006-- A ---62    0063-- O ---71    0120--XTO---23    0177-- D ---63
0007-- N ---73    0064--CNT---47    0121-- - ---34    0178-- π ---56
0008--1/X---17    0065--XTO---23    0122-- - ---34    0179-- L ---72
0009-- A ---62    0066-- O ---71    0123-- - ---34    0180-- O ---71
0010-- L ---72    0067--CNT---47    0124-- - ---34    0181--XTO---23
0011--CNT---47    0068-- O ---71    0125-- - ---34    0182--CNT---47
0012--XTO---23    0069-- π ---56    0126-- - ---34    0183-- O ---71
0013-- α ---13    0070-- E ---60    0127-- - ---34    0184-- N ---73
0014-- A ---62    0071-- α ---13    0128-- - ---34    0185--CNT---47
0015-- C ---61    0072-- A ---62    0129-- A ---62    0186--XTO---23
0016-- K ---55    0073--XTO---23    0130-- I ---65    0187-- G ---15
0017--CLR---20    0074-- I ---65    0131-- N ---73    0188--XTO---23
0018-- A ---62    0075-- O ---71    0132--XTO---23    0189-- - ---34
0019-- I ---65    0076-- N ---73    0133-- E ---60    0190-- - ---34
0020-- M ---70    0077--CNT---47    0134-- α ---13    0191-- - ---34
0021-- π ---56    0078-- L ---72    0135--1/X---17    0192-- - ---34
0022-- O ---71    0079-- A ---62    0136-- π ---56    0193-- E ---60
0023-- I ---65    0080-- B ---66    0137--XTO---23    0194-- π ---56
0024-- N ---73    0081-- E ---60    0138--CNT---47    0195-- L ---72
0025--XTO---23    0082-- L ---72    0139-- α ---13    0196-- O ---71
0026--CNT---47    0083-- - ---34    0140--1/X---17    0197--XTO---23
0027-- π ---56    0084-- - ---34    0141-- N ---73    0198--CNT---47
0028-- α ---13    0085-- - ---34    0142-- - ---34    0199--INT---64
0029-- O ---71    0086-- - ---34    0143-- - ---34    0200--YTO---40
0030-- G ---15    0087-- - ---34    0144-- - ---34    0201-- . ---21
0031-- α ---13    0088-- - ---34    0145-- B ---66    0202--CNT---47
0032-- A ---62    0089-- - ---34    0146-- C ---61    0203-- α ---13
0033-- M ---70    0090-- - ---34    0147-- O ---71    0204-- A ---62
0034--SFL---54    0091-- - ---34    0148-- N ---73    0205-- N ---73
0035--SFL---54    0092-- - ---34    0149--XTO---23    0206-- G ---15
0036--SFL---54    0093-- - ---34    0150-- I ---65    0207-- E ---60
0037--SFL---54    0094-- - ---34    0151-- N ---73    0208--CLR---20
0038--SFL---54    0095-- - ---34    0152--1/X---17    0209--CNT---47
0039--SFL---54    0096-- - ---34    0153-- E ---60    0210-- A ---62
0040--SFL---54    0097-- - ---34    0154--CNT---47    0211--XSQ---12
0041--SFL---54    0098-- - ---34    0155-- α ---13    0212--CNT---47
0042--SFL---54    0099-- E ---60    0156--1/X---17    0213-- A ---62
0043--SFL---54    0100-- N ---73    0157-- N ---73    0214-- N ---73
0044--SFL---54    0101--XTO---23    0158-- - ---34    0215-- G ---15
0045--SFL---54    0102-- E ---60    0159-- - ---34    0216-- L ---72
0046--SFL---54    0103-- α ---13    0160-- - ---34    0217-- E ---60
0047--SFL---54    0104--CNT---47    0161-- C ---61    0218--X:Y---52
0048--SFL---54    0105-- A ---62    0162--XTO---23    0219-- D ---63
0049--SFL---54    0106-- N ---73    0163-- E ---60    0220-- E ---60
0050--CLR---20    0107-- D ---63    0164-- α ---13    0221-- G ---15
0051--CNT---47    0108--CNT---47    0165-- M ---70    0222--PSE---57
0052--CNT---47    0109-- π ---56    0166-- I ---65    0223-- - ---34
0053--CNT---47    0110-- L ---72    0167-- N ---73    0224-- F ---16
0054--CNT---47    0111-- O ---71    0168-- A ---62    0225--CNT---47
0055--CNT---47    0112--XTO---23    0169--XTO---23    0226-- A ---62
0056--CNT---47    0113--CLR---20    0170-- E ---60    0227--XSQ---12
```

```
0228--CNT---47    0288-- A ----62   0348-- -  ---34   0408--XTO---23
0229-- A ---62    0289--XSQ---12   0349-- -  ---34   0409--PSE---57
0230-- N ---73    0290--CNT---47   0350-- M  ---70   0410-- -  ---34
0231-- G ---15    0291-- A ---62   0351-- π  ---56   0411-- -  ---34
0232-- L ---72    0292-- N ---73   0352-- L  ---72   0412-- -  ---34
0233-- E ---60    0293-- G ---15   0353-- O  ---71   0413-- -  ---34
0234--X<Y---52    0294-- L ---72   0354--XTO---23    0414-- -  ---34
0235-- F ---16    0295-- E ---60   0355--CNT---47    0415-- -  ---34
0236--XTO---23    0296--X<Y---52   0356-- α  ---13   0416-- π  ---56
0237--PSE---57    0297-- D ---63   0357--1/X---17    0417-- C  ---61
0238-- - ---34    0298-- E ---60   0358-- N  ---73   0418-- O  ---71
0239-- - ---34    0299-- G ---15   0359-- N  ---73   0419-- α  ---13
0240-- G ---15    0300--PSE---57   0360-- I  ---65   0420-- α  ---13
0241--CNT---47    0301-- - ---34   0361-- N  ---73   0421-- E  ---60
0242-- E ---60    0302-- J ---75   0362-- G  ---15   0422-- C  ---61
0243-- L ---72    0303--CNT---47   0363--CLR---20    0423--XTO---23
0244--CNT---47    0304-- A ---62   0364--CNT---47    0424-- I  ---65
0245-- A ---62    0305--XSQ---12   0365-- M  ---70   0425-- O  ---71
0246-- N ---73    0306--CNT---47   0366-- E  ---60   0426-- N  ---73
0247-- G ---15    0307-- A ---62   0367-- A  ---62   0427--YTO---40
0248-- L ---72    0308-- N ---73   0368-- N  ---73   0428-- -  ---34
0249-- E ---60    0309-- G ---15   0369--CNT---47    0429-- -  ---34
0250--X<Y---52    0310-- L ---72   0370-- O  ---71   0430-- -  ---34
0251-- D ---63    0311-- E ---60   0371-- N  ---73   0431-- -  ---34
0252-- E ---60    0312--X<Y---52   0372--CNT---47    0432--YTO---40
0253-- G ---15    0313-- F ---16   0373--XTO---23    0433--FMT---42
0254--PSE---57    0314--XTO---23   0374-- G  ---15   0434-- 0  ---00
0255-- - ---34    0315--PSE---57   0375--XTO---23    0435-- 0  ---00
0256-- H ---74    0316-- - ---34   0376-- -  ---34   0436-- 0  ---00
0257--CNT---47    0317-- - ---34   0377-- -  ---34   0437-- 0  ---00
0258-- E ---60    0318-- K ---55   0378-- -  ---34   0438-- 0  ---00
0259-- L ---72    0319--CNT---47   0379-- N  ---73   0439-- 0  ---00
0260--CNT---47    0320-- E ---60   0380-- L  ---72   0440-- 0  ---00
0261-- A ---62    0321-- L ---72   0381-- I  ---65   0441-- 0  ---00
0262-- N ---73    0322--CNT---47   0382--YTO---40    0442-- 0  ---00
0263-- G ---15    0323-- A ---62   0383--XTO---23    0443-- 0  ---00
0264-- L ---72    0324-- N ---73   0384--CLR---20    0444-- 0  ---00
0265-- E ---60    0325-- G ---15   0385--CNT---47    0445-- 0  ---00
0266--X<Y---52    0326-- L ---72   0386-- M  ---70   0446-- 0  ---00
0267-- F ---16    0327-- E ---60   0387-- E  ---60   0447-- 0  ---00
0268--XTO---23    0328--X<Y---52   0388-- A  ---62   0448-- 0  ---00
0269--PSE---57    0329-- D ---63   0389-- N  ---73   0449-- 0  ---00
0270-- - ---34    0330-- E ---60   0390--YTO---40    0450-- 0  ---00
0271-- - ---34    0331-- G ---15   0391--X<Y---52    0451-- 0  ---00
0272-- I ---65    0332--PSE---57   0392-- F  ---16   0452-- 0  ---00
0273-- π ---56    0333-- - ---34   0393--XTO---23    0453-- 0  ---00
0274-- L ---72    0334-- L ---72   0394--PSE---57    0454-- 0  ---00
0275-- O ---71    0335--CNT---47   0395-- -  ---34   0455-- 0  ---00
0276--XTO---23    0336-- E ---60   0396-- -  ---34   0456-- 0  ---00
0277--CNT---47    0337-- L ---72   0397-- -  ---34   0457-- 0  ---00
0278--INT---64    0338--CNT---47   0398-- -  ---34   0458-- 0  ---00
0279--YTO---40    0339-- A ---62   0399-- -  ---34   0459-- 0  ---00
0280-- . ---21    0340-- N ---73   0400-- 0  ---00   0460-- 0  ---00
0281--CNT---47    0341-- G ---15   0401--CNT---47    0461-- 0  ---00
0282--XTO---23    0342-- L ---72   0402-- D  ---63   0462-- 0  ---00
0283-- I ---65    0343-- E ---60   0403-- A  ---62   0463-- 0  ---00
0284-- M ---70    0344--X<Y---52   0404--XTO---23    0464-- 0  ---00
0285-- E ---60    0345-- F ---16   0405-- A  ---62   0465-- 0  ---00
0286--CLR---20    0346--XTO---23   0406--X<Y---52    0466-- 0  ---00
0287--CNT---47    0347--PSE---57   0407-- F  ---16   0467-- 0  ---00
```

```
0468--  0  ---00    1970--  0  ---00
0469--  0  ---00    1971--  0  ---00
0470--  0  ---00    1972--  0  ---00
0471--  0  ---00    1973--  0  ---00
0472--  0  ---00    1974--  0  ---00
0473--  0  ---00    1975--  0  ---00
0474--  0  ---00    1976--  0  ---00
0475--  0  ---00    1977--  0  ---00
1950--  0  ---00    1978--  0  ---00
1951--  0  ---00    1979--  0  ---00
1952--  0  ---00    1980--  0  ---00
1953--  0  ---00    1981--  0  ---00
1954--  0  ---00    1982--  0  ---00
1955--  0  ---00    1983--  0  ---00
1956--  0  ---00    1984--  0  ---00
1957--  0  ---00    1985--  0  ---00
1958--  0  ---00    1986--  0  ---00
1959--  0  ---00    1987--  0  ---00
1960--  0  ---00    1988--  0  ---00
1961--  0  ---00    1989--  1  ---01
1962--  0  ---00    1990--FMT---42
1963--  0  ---00    1991--  5  ---05
1964--  0  ---00    1992--CLX---37
1965--  0  ---00    1993--  0  ---00
1966--  0  ---00    1994--FMT---42
1967--  0  ---00    1995--  5  ---05
1968--  0  ---00    1996--S/R---77
1969--  0  ---00    1997--END---46
```

Aimpoint Program - File 1

```
0000--LBL---51      0025--  F  ---16      0050--XTO---23      0110--  4  ---04
0001--  A  ---62    0026--SFL---54         0051--  9  ---11    0111--FMT---42
0002--GTO---44      0027--IFG---43         0052--  1  ---01    0112--FMT---42
0003--S/R---77      0028--FMT---42         0053--FMT---42      0113--  a  ---13
0004--LBL---51      0029--STP---41         0054--FMT---42      0114--1/X---17
0005--  b  ---14    0030--PNT---45         0055--  a  ---13    0115--  N  ---73
0006--FMT---42      0031--XTO---23         0056--  M  ---70    0116--CNT---47
0007--FMT---42      0032--  2  ---02       0057--  I  ---65    0117--  N  ---73
0008--  YE ---24    0033--  6  ---06       0058--  N  ---73    0118--  O  ---71
0009--  a  ---13    0034--FMT---42         0059--X<Y---52      0119--  .  ---21
0010--  E  ---60    0035--FMT---42         0060--  N  ---73    0120--SFL---54
0011--  F  ---16    0036--  a  ---13       0061--  M  ---70    0121--IFG---43
0012--SFL---54      0037--  M  ---70       0062--  I  ---65    0122--FMT---42
0013--IFG---43      0038--  A  ---62       0063--PSE---57      0123--STP---41
0014--FMT---42      0039--  YE ---24       0064--SFL---54      0124--PNT---45
0015--STP---41      0040--X<Y---52         0065--IFG---43      0125--XTO---23
0016--PNT---45      0041--  N  ---73       0066--FMT---42      0126--  9  ---11
0017--XTO---23      0042--  M  ---70       0067--STP---41      0127--  5  ---05
0018--  2  ---02    0043--  I  ---65       0068--PNT---45      0128--FMT---42
0019--  5  ---05    0044--PSE---57         0069--XTO---23      0129--FMT---42
0020--FMT---42      0045--SFL---54         0070--  9  ---11    0130--YTO---40
0021--FMT---42      0046--IFG---43         0071--  2  ---02    0131--XTO---23
0022--XFR---67      0047--FMT---42         0072--FMT---42      0132--  A  ---62
0023--  a  ---13    0048--STP---41         0073--FMT---42      0133--  a  ---13
0024--  E  ---60    0049--PNT---45         0074--  a  ---13    0134--XTO---23
                                           0075--1/X---17      0135--  I  ---65
                                           0076--  N  ---73    0136--  N  ---73
                                           0077--CNT---47      0137--  G  ---15
                                           0078--XTO---23      0138--CNT---47
                                           0079--  I  ---65    0139--  F  ---16
                                           0080--  M  ---70    0140--  I  ---65
                                           0081--  E  ---60    0141--  L  ---72
                                           0082--X<Y---52      0142--  E  ---60
                                           0083--YTO---40      0143--SFL---54
                                           0084--  E  ---60    0144--IFG---43
                                           0085--  C  ---61    0145--FMT---42
                                           0086--PSE---57      0146--STP---41
                                           0087--SFL---54      0147--PNT---45
                                           0088--IFG---43      0148--XTO---23
                                           0089--FMT---42      0149--  9  ---11
                                           0090--STP---41      0150--  6  ---06
                                           0091--PNT---45      0151--FMT---42
                                           0092--XTO---23      0152--FMT---42
                                           0093--  9  ---11    0153--YTO---40
                                           0094--  3  ---03    0154--  A  ---62
                                           0095--FMT---42      0155--  M  ---70
                                           0096--FMT---42      0156--  π  ---56
                                           0097--  O  ---71    0157--  L  ---72
                                           0098--  π  ---56    0158--  E  ---60
                                           0099--CNT---47      0159--CNT---47
                                                               0160--  a  ---13
                                           0100--  N  ---73    0161--  A  ---62
                                           0101--  O  ---71    0162--XTO---23
                                           0102--  .  ---21    0163--  E  ---60
                                           0103--SFL---54      0164--SFL---54
                                           0104--IFG---43      0165--IFG---43
                                           0105--FMT---42      0166--FMT---42
                                           0106--STP---41      0167--STP---41
                                           0107--PNT---45      0168--PNT---45
                                           0108--XTO---23      0169--XTO---23
                                           0109--  9  ---11    0170--  9  ---11
```

| | | | |
|---|---|---|---|
| 0171-- 8 ---10 | 0231-- 9 ---11 | 0291-- UP---27 | 0351-- 9 ---11 |
| 0172--XFR---67 | 0232-- 8 ---10 | 0292--XFR---67 | 0352--CHS---32 |
| 0173-- 9 ---11 | 0233--INT---64 | 0293-- - ---34 | 0353-- UP---27 |
| 0174-- 6 ---06 | 0234--DIV---35 | 0294-- 9 ---11 | 0354-- 1 ---01 |
| 0175--FMT---42 | 0235-- DN---25 | 0295-- 2 ---02 | 0355--XTO---23 |
| 0176-- 5 ---05 | 0236-- UP---27 | 0296--XFR---67 | 0356-- + ---33 |
| 0177--CLX---37 | 0237--INT---64 | 0297--DIV---35 | 0357-- a ---13 |
| 0178--FMT---42 | 0238-- - ---34 | 0298-- 9 ---11 | 0358--XFR---67 |
| 0179--FMT---42 | 0239-- 0 ---00 | 0299-- 3 ---03 | 0359--IND---31 |
| 0180--YTO---40 | 0240--X=Y---50 | 0300--XFR---67 | 0360-- a ---13 |
| 0181--XTO---23 | 0241--GTO---44 | 0301--DIV---35 | 0361--XFR---67 |
| 0182-- A ---62 | 0242--S/R---77 | 0302-- 9 ---11 | 0362-- X ---36 |
| 0183-- a ---13 | 0243--LBL---51 | 0303-- 8 ---10 | 0363-- 3 ---03 |
| 0184--XTO---23 | 0244--1/X---17 | 0304--XFR---67 | 0364-- 0 ---00 |
| 0185--CNT---47 | 0245--XFR---67 | 0305-- X ---36 | 0365-- + ---33 |
| 0186--XTO---23 | 0246-- 0 ---00 | 0306-- 0 ---00 | 0366--YTO---40 |
| 0187-- A ---62 | 0247--PSE---57 | 0307-- - ---34 | 0367--IND---31 |
| 0188-- π ---56 | 0248--PSE---57 | 0308--YTO---40 | 0368-- a ---13 |
| 0189-- E ---60 | 0249--PSE---57 | 0309--IND---31 | 0369-- 1 ---01 |
| 0190--CNT---47 | 0250--PSE---57 | 0310-- a ---13 | 0370--XTO---23 |
| 0191-- A ---62 | 0251--FMT---42 | 0311-- 1 ---01 | 0371-- + ---33 |
| 0192-- N ---73 | 0252-- 3 ---03 | 0312--XTO---23 | 0372-- a ---13 |
| 0193-- D ---63 | 0253-- 3 ---03 | 0313-- + ---33 | 0373-- π ---56 |
| 0194--CLR---20 | 0254-- . ---21 | 0314-- b ---14 | 0374-- UP---27 |
| 0195-- π ---56 | 0255-- UP---27 | 0315--XTO---23 | 0375-- 6 ---06 |
| 0196-- a ---13 | 0256-- 2 ---02 | 0316-- + ---33 | 0376-- 0 ---00 |
| 0197-- E ---60 | 0257-- 0 ---00 | 0317-- 1 ---01 | 0377-- 7 ---07 |
| 0198--YTO---40 | 0258-- 0 ---00 | 0318-- 0 ---00 | 0378-- 6 ---06 |
| 0199--YTO---40 | 0259--CHS---32 | 0319-- 0 ---00 | 0379-- X ---36 |
| 0200--CNT---47 | 0260--DIV---35 | 0320--XTO---23 | 0380-- 1 ---01 |
| 0201-- a ---13 | 0261--YTO---40 | 0321-- - ---34 | 0381-- 8 ---10 |
| 0202-- E ---60 | 0262--IND---31 | 0322-- a ---13 | 0382-- 0 ---00 |
| 0203--YTO---40 | 0263-- a ---13 | 0323--XFR---67 | 0383--DIV---35 |
| 0204-- E ---60 | 0264-- 1 ---01 | 0324--IND---31 | 0384--XFR---67 |
| 0205--XTO---23 | 0265--XTO---23 | 0325-- a ---13 | 0385-- 2 ---02 |
| 0206--FMT---42 | 0266-- + ---33 | 0326-- UP---27 | 0386-- 5 ---05 |
| 0207-- 0 ---00 | 0267-- a ---13 | 0327-- 1 ---01 | 0387-- UP---27 |
| 0208--XTO---23 | 0268--FMT---42 | 0328--XTO---23 | 0388--XFR---67 |
| 0209-- 1 ---01 | 0269-- 3 ---03 | 0329-- - ---34 | 0389-- 2 ---02 |
| 0210-- 0 ---00 | 0270-- 3 ---03 | 0330-- a ---13 | 0390-- 6 ---06 |
| 0211-- 0 ---00 | 0271-- . ---21 | 0331--XFR---67 | 0391--RUP---22 |
| 0212--STP---41 | 0272-- UP---27 | 0332--IND---31 | 0392--XFR---67 |
| 0213-- K ---55 | 0273-- 2 ---02 | 0333-- a ---13 | 0393-- X ---36 |
| 0214-- 2 ---02 | 0274-- 0 ---00 | 0334--XFR---67 | 0394--IND---31 |
| 0215-- A ---62 | 0275-- 0 ---00 | 0335-- X ---36 | 0395-- a ---13 |
| 0216-- 0 ---71 | 0276--DIV---35 | 0336-- 3 ---03 | 0396--DIV---35 |
| 0217--CLR---20 | 0277--YTO---40 | 0337-- 0 ---00 | 0397--RUP---22 |
| 0218-- 3 ---03 | 0278--IND---31 | 0338--XEY---30 | 0398--XEY---30 |
| 0219-- 1 ---01 | 0279-- a ---13 | 0339--XFR---67 | 0399--DIV---35 |
| 0220--XTO---23 | 0280-- 1 ---01 | 0340-- X ---36 | 0400-- 1 ---01 |
| 0221-- + ---33 | 0281--XTO---23 | 0341-- 9 ---11 | 0401--XTO---23 |
| 0222-- a ---13 | 0282-- + ---33 | 0342-- 9 ---11 | 0402-- - ---34 |
| 0223--XFR---67 | 0283-- a ---13 | 0343-- + ---33 | 0403-- a ---13 |
| 0224-- 0 ---00 | 0284--FMT---42 | 0344-- YE---24 | 0404--RUP---22 |
| 0225-- UP---27 | 0285-- 3 ---03 | 0345--IND---31 | 0405--XTO---23 |
| 0226-- . ---21 | 0286-- 3 ---03 | 0346-- a ---13 | 0406-- + ---33 |
| 0227-- 9 ---11 | 0287-- . ---21 | 0347-- DN---25 | 0407--IND---31 |
| 0228-- 0 ---00 | 0288--XFR---67 | 0348--XFR---67 | 0408-- a ---13 |
| 0229--XFR---67 | 0289-- 9 ---11 | 0349-- X ---36 | 0409-- 1 ---01 |
| 0230-- X ---36 | 0290-- 1 ---01 | 0350-- 9 ---11 | 0410--XTO---23 |

```
0411-- - ---34    0471-- 0 ---00    0531-- 5 ---05    0591-- 1 ---01
0412-- a ---13    0472-- 0 ---00    0532--EEX---26    0592-- 5 ---05
0413--RUP---22    0473-- 0 ---00    0533--XTO---23    0593-- 3 ---03
0414--XTO---23    0474-- 0 ---00    0534-- 0 ---00    0594-- 1 ---01
0415-- + ---33    0475-- 0 ---00    0535-- 9 ---11    0595--FMT---42
0416--IND---31    0476-- 0 ---00    0536-- 7 ---07    0596-- 5 ---05
0417-- a ---13    0477-- 0 ---00    0537-- 7 ---07    0597--XFR---67
0418--GTO---44    0478-- 0 ---00    0538-- 8 ---10    0598--GTO---44
0419--S/R---77    0479-- 0 ---00    0539-- UP---27    0599-- 5 ---05
0420--LBL---51    0480-- 0 ---00    0540-- 3 ---03    0600-- 5 ---05
0421--XSQ---12    0481-- 0 ---00    0541-- 1 ---01    0601-- 7 ---07
0422-- 0 ---71    0482-- 0 ---00    0542--FMT---42    0602--GTO---44
0423--FMT---42    0483-- 0 ---00    0543-- 5 ---05    0603--S/R---77
0424-- 1 ---01    0484-- 0 ---00    0544--XTO---23    0604--LBL---51
0425-- UP---27    0485-- 0 ---00    0545--STP---41    0605--XSQ---12
0426--FMT---42    0486-- 0 ---00    0546-- 0 ---00    0606-- 0 ---71
0427-- DN---25    0487-- 0 ---00    0547--LBL---51    0607-- 1 ---01
0428--FMT---42    0488-- 0 ---00    0548-- C ---61    0608--XTO---23
0429-- UP---27    0489-- 0 ---00    0549--GTO---44    0609-- + ---33
0430--XFR---67    0490-- 0 ---00    0550--S/R---77    0610-- b ---14
0431-- 9 ---11    0491-- 0 ---00    0551--LBL---51    0611--GTO---44
0432-- 2 ---02    0492-- 0 ---00    0552-- YE---24    0612-- 5 ---05
0433-- UP---27    0493-- 0 ---00    0553-- K ---55    0613-- 5 ---05
0434--XFR---67    0494-- 0 ---00    0554-- 2 ---02    0614-- 9 ---11
0435--IND---31    0495-- 0 ---00    0555-- A ---62    0615--FMT---42
0436-- a ---13    0496--LBL---51    0556-- 0 ---71    0616-- 5 ---05
0437--X<Y---52    0497--XTO---23    0557--CLR---20    0617-- r ---76
0438--GTO---44    0498-- a ---13    0558-- 3 ---03    0618--FMT---42
0439--LBL---51    0499--XTO---23    0559-- 1 ---01    0619--FMT---42
0440--IND---31    0500-- 1 ---01    0560--XTO---23    0620-- YE---24
0441--CNT---47    0501-- 0 ---00    0561-- + ---33    0621-- a ---13
0442-- 2 ---02    0502-- 4 ---04    0562-- a ---13    0622-- E ---60
0443-- 0 ---00    0503-- b ---14    0563--XFR---67    0623-- F ---16
0444-- UP---27    0504--XTO---23    0564-- 0 ---00    0624--FMT---42
0445-- b ---14    0505-- - ---34    0565-- UP---27    0625--STP---41
0446--X=Y---50    0506-- 1 ---01    0566--XFR---67    0626--XTO---23
0447-- 0 ---00    0507-- 0 ---00    0567-- 1 ---01    0627-- 2 ---02
0448-- 4 ---04    0508-- 3 ---03    0568-- 0 ---00    0628-- 5 ---05
0449-- 5 ---05    0509--S/R---77    0569-- 0 ---00    0629--PNT---45
0450-- 6 ---06    0510--LBL---51    0570--X=Y---50    0630--FMT---42
0451--GTO---44    0511-- B ---66    0571-- 0 ---00    0631--FMT---42
0452-- 0 ---00    0512--FMT---42    0572-- 5 ---05    0632--XFR---67
0453-- 2 ---02    0513--FMT---42    0573-- 7 ---07    0633-- a ---13
0454-- 1 ---01    0514-- F ---16    0574-- 9 ---11    0634-- E ---60
0455-- 9 ---11    0515-- I ---65    0575--GTO---44    0635-- F ---16
0456-- 7 ---07    0516-- a ---13    0576-- 6 ---06    0636--FMT---42
0457-- 8 ---10    0517--YTO---40    0577-- 0 ---00    0637--STP---41
0458-- UP---27    0518--XTO---23    0578-- 2 ---02    0638--XTO---23
0459-- 3 ---03    0519--CNT---47    0579--FMT---42    0639-- 2 ---02
0460-- 1 ---01    0520-- F ---16    0580-- 5 ---05    0640-- 6 ---06
0461--FMT---42    0521-- I ---65    0581--EEX---26    0641--PNT---45
0462-- 5 ---05    0522-- L ---72    0582-- UP---27    0642--FMT---42
0463--XTO---23    0523-- E ---60    0583-- 1 ---01    0643--FMT---42
0464--GTO---44    0524--SFL---54    0584-- - ---34    0644--YTO---40
0465-- 2 ---02    0525--FMT---42    0585--XFR---67    0645--XTO---23
0466-- 1 ---01    0526--XFR---67    0586-- 9 ---11    0646-- A ---62
0467-- 7 ---07    0527-- 9 ---11    0587-- 7 ---07    0647-- a ---13
0468--STP---41    0528-- 6 ---06    0588--X=Y---50    0648--XTO---23
0469-- 0 ---00    0529--PNT---45    0589-- 0 ---00    0649--CNT---47
0470-- 0 ---00    0530--FMT---42    0590-- 6 ---06    0650--XTO---23
```

```
0651--  A  ---62    0711--  E  ---60    0771--  +  ---33    0831--FMT---42
0652--  π  ---56    0712--  N  ---73    0772-- DN ---25    0832--  5  ---05
0653--  E  ---60    0713--XTO---23    0773--  Γ  ---76    0833--XFR---67
0654--CLR----20     0714--  E  ---60    0774-- UP ---27    0834--XFR---67
0655--  π  ---56    0715--  α  ---13    0775-- UP ---27    0835--  2  ---02
0656--  α  ---13    0716--FMT---42    0776--XFR---67    0836--  8  ---10
0657--  E  ---60    0717--FMT---42    0777--  2  ---02    0837--XTO---23
0658--YTO----40     0718--  3  ---03    0778--  8  ---10    0838--  9  ---11
0659--YTO----40     0719--  3  ---03    0779--RUP---22    0839--  2  ---02
0660--CNT----47     0720--  .  ---21    0780--DIV---35    0840--XFR---67
0661--  α  ---13    0721--CHS---32    0781--YTO---40    0841--  3  ---03
0662--  E  ---60    0722--XTO---23    0782--  3  ---03    0842--  0  ---00
0663--YTO----40     0723--  2  ---02    0783--  0  ---00    0843--XTO---23
0664--  E  ---60    0724--  8  ---10    0784--XFR---67    0844--  9  ---11
0665--XTO---23     0725--FMT---42    0785--  2  ---02    0845--  7  ---07
0666--FMT---42     0726--  3  ---03    0786--  9  ---11    0846--XFR---67
0667--STP---41     0727--  3  ---03    0787--RUP---22    0847--  0  ---00
0668--GTO---44     0728--  .  ---21    0788--DIV---35    0848--XFR---67
0669--  2  ---02    0729-- UP ---27    0789--YTO---40    0849--DIV---35
0670--  4  ---04    0730--XTO---23    0790--  9  ---11    0850--  9  ---11
0671--  1  ---01    0731--  2  ---02    0791--  9  ---11    0851--  8  ---10
0672--STP---41     0732--  9  ---11    0792--FMT---42    0852--XTO---23
0673--  0  ---00    0733--FMT---42    0793--  1  ---01    0853--  9  ---11
0674--LBL---51     0734--  3  ---03    0794--FMT---42    0854--  3  ---03
0675--1/X---17     0735--  3  ---03    0795--  .  ---21    0855--  .  ---21
0676--FMT---42     0736--  .  ---21    0796--FMT---42    0856--  0  ---00
0677--FMT---42     0737--  0  ---00    0797--S/R---77    0857--  8  ---10
0678--CLR---20     0738-- UP ---27    0798--  0  ---00    0858--FMT---42
0679--  π  ---56    0739--XFR---67    0799--  0  ---00    0859--  1  ---01
0680--  L  ---72    0740--  2  ---02    0800--LBL---51    0860--  1  ---01
0681--  P  ---62    0741--  8  ---10    0801--IND---31    0861--FMT---42
0682--  C  ---61    0742--X<Y---52    0802--XFR---67    0862--  5  ---05
0683--  E  ---60    0743--  0  ---00    0803--IND---31    0863--  Γ  ---76
0684--CNT---47     0744--  7  ---07    0804--  α  ---13    0864--  7  ---07
0685--YTO---40     0745--  5  ---05    0805--XTO---23    0865--  8  ---10
0686--XFR---67     0746--  1  ---01    0806--  2  ---02    0866-- UP ---27
0687--  M  ---70    0747--GTO---44    0807--  8  ---10    0867--  3  ---03
0688--  B  ---66    0748--  7  ---07    0808--FMT---42    0868--  1  ---01
0689--  O  ---71    0749--  6  ---06    0809--  5  ---05    0869--FMT---42
0690--  L  ---72    0750--  2  ---02    0810--EEX---26    0870--  5  ---05
0691--YTO---40     0751--CHS---32    0811--XTO---23    0871--XTO---23
0692--CNT---47     0752--XTO---23    0812--  0  ---00    0872--  1  ---01
0693--  O  ---71    0753--  2  ---02    0813--  3  ---03    0873--XFR---67
0694--  N  ---73    0754--  8  ---10    0814--  0  ---00    0874--  +  ---33
0695--  H  ---74    0755--XFR---67    0815--  7  ---07    0875--  3  ---03
0696--  O  ---71    0756--  2  ---02    0816--  8  ---10    0876--  0  ---00
0697--  α  ---13    0757--  9  ---11    0817-- UP ---27    0877-- UP ---27
0698--  I  ---65    0758--CHS---32    0818--  3  ---03    0878--FMT---42
0699--XSQ---12     0759--XTO---23    0819--  1  ---01    0879--  5  ---05
0700--  O  ---71    0760--  2  ---02    0820--FMT---42    0880--EEX---26
0701--  N  ---73    0761--  9  ---11    0821--  5  ---05    0881--X=Y---50
0702--  A  ---62    0762--XFR---67    0822--XTO---23    0882--  0  ---00
0703--  L  ---72    0763--  2  ---02    0823--XFR---67    0883--  8  ---10
0704--CLX---37     0764--  9  ---11    0824--  9  ---11    0884--  9  ---11
0705--CNT---47     0765--XSQ---12    0825--  6  ---06    0885--  0  ---00
0706--  π  ---56    0766-- UP ---27    0826--FMT---42    0886--GTO---44
0707--  α  ---13    0767--XFR---67    0827--  5  ---05    0887--  8  ---10
0708--  E  ---60    0768--  2  ---02    0828--CLX---37    0888--  2  ---02
0709--YTO---40     0769--  8  ---10    0829--  3  ---03    0889--  9  ---11
0710--YTO---40     0770--XSQ---12    0830--  1  ---01    0890--GTO---44
```

```
0891--S/R---77    0952-- 5 ---05    1013--FMT---42    1074--FMT---42
0892--LBL---51    0953--CLX---37    1014-- 1 ---01    1075-- 1 ---01
0893--XFR---67    0954-- 3 ---03    1015--FMT---42    1076--PNT---45
0894--FMT---42    0955-- 1 ---01    1016--CNT---47    1077--FMT---42
0895--FMT---42    0956--FMT---42    1017-- α ---13    1078-- 1 ---01
0896--CLR---20    0957-- 5 ---05    1018--1/X---17    1079--FMT---42
0897-- I ---65    0958--XFR---67    1019-- N ---73    1080--CNT---47
0898-- N ---73    0959--S/R---77    1020--CNT---47    1081-- N ---73
0899--YTO---40    0960-- 0 ---00    1021--FMT---42    1082-- M ---70
0900-- E ---60    0961--LBL---51    1022--XFR---67    1083-- I ---65
0901-- α ---13    0962--XFR---67    1023-- 9 ---11    1084--FMT---42
0902--XTO---23    0963-- . ---21    1024-- 5 ---05    1085--GTO---44
0903--CNT---47    0964-- 1 ---01    1025--FMT---42    1086--S/R---77
0904-- α ---13    0965-- 0 ---00    1026-- 1 ---01    1087--LBL---51
0905-- E ---60    0966--FMT---42    1027--PNT---45    1088--XTO---23
0906-- D ---63    0967-- 1 ---01    1028-- . ---21    1089--FMT---42
0907--CNT---47    0968-- 1 ---01    1029-- 0 ---00    1090-- 1 ---01
0908-- π ---56    0969--FMT---42    1030-- 8 ---10    1091--FMT---42
0909-- E ---60    0970-- 1 ---01    1031--FMT---42    1092-- M ---70
0910-- N ---73    0971-- 8 ---10    1032-- 1 ---01    1093-- I ---65
0911--FMT---42    0972-- 0 ---00    1033-- 1 ---01    1094-- N ---73
0912--STP---41    0973-- 4 ---04    1034--FMT---42    1095--CNT---47
0913-- C ---61    0974-- 0 ---00    1035-- 1 ---01    1096-- α ---13
0914--FMT---42    0975-- 0 ---00    1036-- 8 ---10    1097-- A ---62
0915-- 1 ---01    0976-- 0 ---00    1037-- 2 ---02    1098-- N ---73
0916-- UP ---27   0977--XTO---23    1038-- 9 ---11    1099-- G ---15
0917--FMT---42    0978-- α ---13    1039-- 4 ---04    1100-- E ---60
0918-- 1 ---01    0979--XTO---23    1040-- 0 ---00    1101--SFL---54
0919-- 4 ---04    0980-- 1 ---01    1041-- 0 ---00    1102--CNT---47
0920--STP---41    0981-- 0 ---00    1042--XTO---23    1103--FMT---42
0921-- 0 ---00    0982-- 4 ---04    1043-- 1 ---01    1104--XFR---67
0922--LBL---51    0983-- 3 ---03    1044-- 0 ---00    1105-- 9 ---11
0923-- YE---24    0984-- 0 ---00    1045-- 3 ---03    1106-- 2 ---02
0924--FMT---42    0985-- 0 ---00    1046-- 7 ---07    1107--FMT---42
0925--FMT---42    0986--XTO---23    1047-- 5 ---05    1108-- 1 ---01
0926--CLR---20    0987-- b ---14    1048-- 0 ---00    1109--PNT---45
0927-- F ---16    0988-- 9 ---11    1049-- 0 ---00    1110--FMT---42
0928-- I ---65    0989-- 5 ---05    1050--XTO---23    1111-- 1 ---01
0929-- α ---13    0990-- 0 ---00    1051-- α ---13    1112--FMT---42
0930--YTO---40    0991-- 0 ---00    1052--XTO---23    1113--CNT---47
0931--XTO---23    0992--XTO---23    1053-- 1 ---01    1114-- N ---73
0932--CNT---47    0993-- 1 ---01    1054-- 0 ---00    1115-- M ---70
0933-- D ---63    0994-- 0 ---00    1055-- 4 ---04    1116-- I ---65
0934-- A ---62    0995-- 3 ---03    1056--FMT---42    1117--FMT---42
0935--XTO---23    0996--FMT---42    1057-- 1 ---01    1118--GTO---44
0936-- A ---62    0997-- 1 ---01    1058--FMT---42    1119--S/R---77
0937--CNT---47    0998--FMT---42    1059-- M ---70    1120--LBL---51
0938-- F ---16    0999-- O ---71    1060-- A ---62    1121--XTO---23
0939-- I ---65    1000-- π ---56    1061-- YE---24    1122--FMT---42
0940-- L ---72    1001--CNT---47    1062--CNT---47    1123-- 1 ---01
0941-- E ---60    1002--FMT---42    1063-- α ---13    1124--FMT---42
0942--CLR---20    1003--XFR---67    1064-- A ---62    1125-- α ---13
0943-- N ---73    1004-- 9 ---11    1065-- N ---73    1126--1/X---17
0944-- O ---71    1005-- 4 ---04    1066-- G ---15    1127-- N ---73
0945-- . ---21    1006--FMT---42    1067-- E ---60    1128--CNT---47
0946--SFL---54    1007-- 1 ---01    1068--SFL---54    1129--XTO---23
0947--IFG---43    1008--PNT---45    1069--CNT---47    1130-- I ---65
0948--FMT---42    1009--GTO---44    1070--FMT---42    1131-- M ---70
0949--STP---41    1010--S/R---77    1071--XFR---67    1132-- E ---60
0950--PNT---45    1011--LBL---51    1072-- 9 ---11    1133--SFL---54
0951--FMT---42    1012--XTO---23    1073-- 1 ---01    1134--CNT---47
```

```
1135--FMT---42    1196--  F ---16    1257--XTO---23    1318--  I ---65
1136--XFR---67    1197--  I ---65    1258--  + ---33    1319--  N ---73
1137--  9 ---11    1198--  L ---72    1259--  α ---13    1320--YTO---40
1138--  3 ---03    1199--  E ---60    1260--GTO---44    1321--  E ---60
1139--FMT---42    1200--YTO---40    1261--S/R---77    1322--  α ---13
1140--  1 ---01    1201--CNT---47    1262--LBL---51    1323--XTO---23
1141--FNT---45    1202--FMT---42    1263--XSQ---12    1324--CNT---47
1142--FMT---42    1203--XFR---67    1264--  0 ---71    1325--  α ---13
1143--  1 ---01    1204--  9 ---11    1265--FMT---42    1326--  E ---60
1144--FMT---42    1205--  6 ---06    1266--  1 ---01    1327--  D ---63
1145--CNT---47    1206--FMT---42    1267-- UP ---27    1328--CNT---47
1146--YTO---40    1207--  1 ---01    1268--FMT---42    1329--  π ---56
1147--  E ---60    1208--PNT---45    1269-- DN ---25    1330--  E ---60
1148--  C ---61    1209--FMT---42    1270--FMT---42    1331--  N ---73
1149--FMT---42    1210--  1 ---01    1271-- UP ---27    1332--FMT---42
1150--GTO---44    1211--FMT---42    1272--CNT---47    1333--STP---41
1151--S/R---77    1212--  - ---34    1273--XFR---67    1334--FMT---42
1152--LBL---51    1213--FMT---42    1274--  1 ---01    1335--  1 ---01
1153--XTO---23    1214--XFR---67    1275--  0 ---00    1336-- UP ---27
1154--FMT---42    1215--  9 ---11    1276--  0 ---00    1337--FMT---42
1155--  1 ---01    1216--  7 ---07    1277-- UP ---27    1338--  1 ---01
1156--FMT---42    1217--FMT---42    1278--XFR---67    1339--  4 ---04
1157--YTO---40    1218--  1 ---01    1279--  0 ---00    1340--STP---41
1158--  A ---62    1219--PNT---45    1280--X=Y---50    1341--  0 ---00
1159--  M ---70    1220--  0 ---00    1281--  1 ---01    1342--  0 ---00
1160--  π ---56    1221-- UP ---27    1282--  2 ---02    1343--LBL---51
1161--  L ---72    1222--FMT---42    1283--  9 ---11    1344--XSQ---12
1162--  E ---60    1223--  1 ---01    1284--  0 ---00    1345--  6 ---06
1163--CNT---47    1224-- UP ---27    1285--GTO---44    1346--  0 ---00
1164--  α ---13    1225--S/R---77    1286--  1 ---01    1347--  7 ---07
1165--  A ---62    1226--  0 ---00    1287--  2 ---02    1348--  6 ---06
1166--XTO---23    1227--  0 ---00    1288--  5 ---05    1349-- UP ---27
1167--  E ---60    1228--LBL---51    1289--  6 ---06    1350--  π ---56
1168--SFL---54    1229--  D ---63    1290--FMT---42    1351--  X ---36
1169--CNT---47    1230--  1 ---01    1291--  5 ---05    1352--  1 ---01
1170--FMT---42    1231--XTO---23    1292--EEX---26    1353--  8 ---10
1171--FMT---42    1232--  - ---34    1293-- UP ---27    1354--  0 ---00
1172--  1 ---01    1233--  α ---13    1294--  1 ---01    1355--DIV---35
1173--  8 ---10    1234--GTO---44    1295--  - ---34    1356-- DN ---25
1174--  0 ---00    1235--LBL---51    1296--XFR---67    1357-- UP ---27
1175--XFR---67    1236--IND---31    1297--  9 ---11    1358-- UP ---27
1176--  9 ---11    1237--  0 ---00    1298--  7 ---07    1359--XFR---67
1177--  8 ---10    1238--  0 ---00    1299--X=Y---50    1360--IND---31
1178--FMT---42    1239--  0 ---00    1300--  1 ---01    1361--  X ---36
1179--  1 ---01    1240--LBL---51    1301--  3 ---03    1362--  α ---13
1180--PNT---45    1241--  E ---60    1302--  1 ---01    1363--RUP---22
1181--FMT---42    1242--GTO---44    1303--  4 ---04    1364--  1 ---01
1182--  1 ---01    1243--S/R---77    1304--  3 ---03    1365--XTO---23
1183--FMT---42    1244--LBL---51    1305--  1 ---01    1366--  + ---33
1184--CNT---47    1245-- YE ---24    1306--FMT---42    1367--  α ---13
1185--YTO---40    1246--GTO---44    1307--  5 ---05    1368--XFR---67
1186--  π ---56    1247--S/R---77    1308--XFR---67    1369--IND---31
1187--YTO---40    1248--LBL---51    1309--GTO---44    1370--  α ---13
1188--FMT---42    1249--XFR---67    1310--  1 ---01    1371--RUP---22
1189--GTO---44    1250--  K ---55    1311--  2 ---02    1372--  X ---36
1190--S/R---77    1251--  2 ---02    1312--  5 ---05    1373--  1 ---01
1191--LBL---51    1252--  A ---62    1313--  4 ---04    1374--XTO---23
1192--XTO---23    1253--  0 ---71    1314--  C ---61    1375--  + ---33
1193--FMT---42    1254--CLR---20    1315--FMT---42    1376--  α ---13
1194--  1 ---01    1255--  3 ---03    1316--FMT---42    1377--XFR---67
1195--FMT---42    1256--  1 ---01    1317--CLR---20    1378--IND---31
```

| | | | |
|---|---|---|---|
| 1379-- a ---13 | 1440-- 4 ---04 | 1501--XFR---67 | 1562-- 8 ---10 |
| 1380-- X ---36 | 1441-- 9 ---11 | 1502--GTO---44 | 1563-- 0 ---00 |
| 1381--RUP---22 | 1442-- 4 ---04 | 1503--S/R---77 | 1564--DIV---35 |
| 1382-- X ---36 | 1443--LBL---51 | 1504--LBL---51 | 1565--YTO---40 |
| 1383--RUP---22 | 1444-- J ---75 | 1505-- b ---14 | 1566-- X ---36 |
| 1384--RUP---22 | 1445-- 9 ---11 | 1506--FMT---42 | 1567-- 5 ---05 |
| 1385--S/R---77 | 1446--XTO---23 | 1507-- 5 ---05 | 1568--YTO---40 |
| 1386-- 0 ---00 | 1447-- 0 ---00 | 1508-- r ---76 | 1569-- X ---36 |
| 1387--LBL---51 | 1448--CNT---47 | 1509-- 1 ---01 | 1570-- 7 ---07 |
| 1388-- F ---16 | 1449-- 4 ---04 | 1510-- 1 ---01 | 1571-- b ---14 |
| 1389-- 8 ---10 | 1450--XTO---23 | 1511--FMT---42 | 1572--XFR---67 |
| 1390--XTO---23 | 1451-- 1 ---01 | 1512-- 5 ---05 | 1573--DIV---35 |
| 1391-- 0 ---00 | 1452--GTO---44 | 1513--XFR---67 | 1574-- 7 ---07 |
| 1392--CNT---47 | 1453-- 1 ---01 | 1514--CLR---20 | 1575-- 8 ---10 |
| 1393-- 4 ---04 | 1454-- 4 ---04 | 1515-- 1 ---01 | 1576--XTO---23 |
| 1394--XTO---23 | 1455-- 9 ---11 | 1516-- 0 ---00 | 1577-- 9 ---11 |
| 1395-- 1 ---01 | 1456-- 4 ---04 | 1517--XTO---23 | 1578-- b ---14 |
| 1396--GTO---44 | 1457--LBL---51 | 1518-- a ---13 | 1579-- UP---27 |
| 1397-- 1 ---01 | 1458-- K ---55 | 1519-- 1 ---01 | 1580-- 0 ---00 |
| 1398-- 4 ---04 | 1459-- 9 ---11 | 1520--XTO---23 | 1581--X<Y---52 |
| 1399-- 9 ---11 | 1460--XTO---23 | 1521-- + ---33 | 1582-- 1 ---01 |
| 1400-- 4 ---04 | 1461-- 0 ---00 | 1522-- a ---13 | 1583-- 5 ---05 |
| 1401--LBL---51 | 1462--CNT---47 | 1523--XFR---67 | 1584-- 9 ---11 |
| 1402-- G ---15 | 1463-- 5 ---05 | 1524--IND---31 | 1585-- 6 ---06 |
| 1403-- 8 ---10 | 1464--XTO---23 | 1525-- a ---13 | 1586--XFR---67 |
| 1404--XTO---23 | 1465-- 1 ---01 | 1526--XTO---23 | 1587--IND---31 |
| 1405-- 0 ---00 | 1466--GTO---44 | 1527-- 4 ---04 | 1588-- 1 ---01 |
| 1406--CNT---47 | 1467-- 1 ---01 | 1528--XTO---23 | 1589-- UP---27 |
| 1407-- 5 ---05 | 1468-- 4 ---04 | 1529-- 0 ---00 | 1590--XFR---67 |
| 1408--XTO---23 | 1469-- 9 ---11 | 1530-- 0 ---00 | 1591--IND---31 |
| 1409-- 1 ---01 | 1470-- 4 ---04 | 1531-- 5 ---05 | 1592-- 0 ---00 |
| 1410--GTO---44 | 1471--LBL---51 | 1532-- 1 ---01 | 1593--FMT---42 |
| 1411-- 1 ---01 | 1472-- L ---72 | 1533--XTO---23 | 1594-- 1 ---01 |
| 1412-- 4 ---04 | 1473-- 9 ---11 | 1534-- + ---33 | 1595-- UP---27 |
| 1413-- 9 ---11 | 1474--XTO---23 | 1535-- a ---13 | 1596--XFR---67 |
| 1414-- 4 ---04 | 1475-- 0 ---00 | 1536--XFR---67 | 1597--IND---31 |
| 1415--LBL---51 | 1476--CNT---47 | 1537--IND---31 | 1598-- 1 ---01 |
| 1416-- H ---74 | 1477-- 6 ---06 | 1538-- a ---13 | 1599-- UP---27 |
| 1417-- 8 ---10 | 1478--XTO---23 | 1539--XTO---23 | 1600--XFR---67 |
| 1418--XTO---23 | 1479-- 1 ---01 | 1540-- 6 ---06 | 1601--IND---31 |
| 1419-- 0 ---00 | 1480--GTO---44 | 1541--XTO---23 | 1602-- 0 ---00 |
| 1420--CNT---47 | 1481-- 1 ---01 | 1542-- 7 ---07 | 1603--FMT---42 |
| 1421-- 6 ---06 | 1482-- 4 ---04 | 1543--CNT---47 | 1604-- 1 ---01 |
| 1422--XTO---23 | 1483-- 9 ---11 | 1544-- 1 ---01 | 1605-- DN---25 |
| 1423-- 1 ---01 | 1484-- 4 ---04 | 1545--XTO---23 | 1606-- 1 ---01 |
| 1424--GTO---44 | 1485--LBL---51 | 1546-- + ---33 | 1607--XTO---23 |
| 1425-- 1 ---01 | 1486-- M ---70 | 1547-- a ---13 | 1608-- + ---33 |
| 1426-- 4 ---04 | 1487-- 9 ---11 | 1548--XFR---67 | 1609-- b ---14 |
| 1427-- 9 ---11 | 1488--XTO---23 | 1549--IND---31 | 1610--XFR---67 |
| 1428-- 4 ---04 | 1489-- 0 ---00 | 1550-- a ---13 | 1611-- 8 ---10 |
| 1429--LBL---51 | 1490--CNT---47 | 1551--XTO---23 | 1612-- 0 ---00 |
| 1430-- I ---65 | 1491-- 7 ---07 | 1552-- 8 ---10 | 1613-- UP---27 |
| 1431-- 8 ---10 | 1492--XTO---23 | 1553-- UP---27 | 1614-- b ---14 |
| 1432--XTO---23 | 1493-- 1 ---01 | 1554-- 6 ---06 | 1615--X=Y---50 |
| 1433-- 0 ---00 | 1494--GTO---44 | 1555-- 0 ---00 | 1616-- 1 ---01 |
| 1434--CNT---47 | 1495--S/R---77 | 1556-- 7 ---07 | 1617-- 6 ---06 |
| 1435-- 7 ---07 | 1496--LBL---51 | 1557-- 6 ---06 | 1618-- 2 ---02 |
| 1436--XTO---23 | 1497-- YE---24 | 1558-- X ---36 | 1619-- 5 ---05 |
| 1437-- 1 ---01 | 1498--GTO---44 | 1559-- n ---56 | 1620--GTO---44 |
| 1438--GTO---44 | 1499--S/R---77 | 1560-- X ---36 | 1621-- 1 ---01 |
| 1439-- 1 ---01 | 1500--LBL---51 | 1561-- 1 ---01 | 1622-- 5 ---05 |

```
1623--  1  ---01     1684--  A  ---62     1745--  6  ---06     1806--IFG---43
1624--  9  ---11     1685--  0  ---71     1746--  3  ---03     1807--FMT---42
1625--FMT---42       1686--  0  ---00     1747--  1  ---01     1808--STP---41
1626--  5  ---05     1687--XTO---23       1748--FMT---42       1809--PNT---45
1627--EEX---26       1688--  o  ---13     1749--  5  ---05     1810--FMT---42
1628-- UP ---27      1689--  3  ---03     1750--XFR---67       1811--  1  ---01
1629--  1  ---01     1690--  1  ---01     1751--GTO---44       1812--  3  ---03
1630--  -  ---34     1691--XTO---23       1752--  1  ---01     1813--S/R---77
1631--XFR---67       1692--  +  ---33     1753--  6  ---06     1814--  0  ---00
1632--  7  ---07     1693--  o  ---13     1754--  8  ---10     1815--  0  ---00
1633--  7  ---07     1694--GTO---44       1755--  4  ---04     1816--  0  ---00
1634--X=Y---50       1695--S/R---77       1756--STP---41       1817--  0  ---00
1635--  1  ---01     1696--LBL---51       1757--  0  ---00     1818--  0  ---00
1636--  6  ---06     1697--XSO---12       1758--LBL---51       1819--LBL---51
1637--  4  ---04     1698--  0  ---71     1759--  b  ---14     1820--YTO---40
1638--  9  ---11     1699--  1  ---01     1760--FMT---42       1821--  2  ---02
1639--  1  ---01     1700--XTO---23       1761--FMT---42       1822--FMT---42
1640--  1  ---01     1701--  +  ---33     1762--CLR---20       1823--  5  ---05
1641--FMT---42       1702--  b  ---14     1763-- YE ---24      1824--CLX---37
1642--  5  ---05     1703--  b  ---14     1764--  M  ---70     1825--  0  ---00
1643--XFR---67       1704-- UP ---27      1765--  A  ---62     1826--FMT---42
1644--GTO---44       1705--XFR---67       1766-- YE ---24      1827--  5  ---05
1645--  1  ---01     1706--  1  ---01     1767--SFL---54       1828--S/R---77
1646--  5  ---05     1707--  0  ---00     1768--IFG---43       1829--  0  ---00
1647--  1  ---01     1708--  0  ---00     1769--FMT---42       1830--  0  ---00
1648--  5  ---05     1709--X=Y---50       1770--STP---41       1831--  0  ---00
1649--STP---41       1710--  1  ---01     1771--PNT---45       1832--  0  ---00
1650--  0  ---00     1711--  7  ---07     1772-- UP ---27      1833--  0  ---00
1651--  0  ---00     1712--  1  ---01     1773--FMT---42       1834--  0  ---00
1652--LBL---51       1713--  9  ---11     1774--FMT---42       1835--  0  ---00
1653--  N  ---73     1714--GTO---44       1775-- YE ---24      1836--  0  ---00
1654--GTO---44       1715--  1  ---01     1776--  M  ---70     1837--  0  ---00
1655--S/R---77       1716--  6  ---06     1777--  I  ---65     1838--  0  ---00
1656--LBL---51       1717--  9  ---11     1778--  N  ---73     1839--  0  ---00
1657-- YE ---24      1718--  0  ---00     1779--SFL---54       1840--  0  ---00
1658--GTO---44       1719--  C  ---61     1780--IFG---43       1841--  0  ---00
1659--S/R---77       1720--FMT---42       1781--FMT---42       1842--GTO---44
1660--LBL---51       1721--  1  ---01     1782--STP---41       1843--LBL---51
1661--XFR---67       1722-- UP ---27      1783--PNT---45       1844--  A  ---62
1662--FMT---42       1723--  b  ---14     1784--FMT---42       1845--  0  ---00
1663--FMT---42       1724-- UP ---27      1785--  1  ---01     1846--  0  ---00
1664--CLR---20       1725--  2  ---02     1786--  2  ---02     1847--  0  ---00
1665--  I  ---65     1726--  0  ---00     1787--FMT---42       1848--  0  ---00
1666--  N  ---73     1727--DIV---35       1788--FMT---42       1849--  0  ---00
1667--YTO---40       1728-- DN ---25      1789--XFR---67       1850--  0  ---00
1668--  E  ---60     1729--FMT---42       1790--  M  ---70     1851--  0  ---00
1669--  o  ---13     1730--  1  ---01     1791--  A  ---62     1852--GTO---44
1670--XTO---23       1731--PNT---45       1792-- YE ---24      1853--LBL---51
1671--CNT---47       1732--FMT---42       1793--SFL---54       1854--  B  ---66
1672--  o  ---13     1733--  5  ---05     1794--IFG---43       1855--  0  ---00
1673--  E  ---60     1734--EEX---26       1795--FMT---42       1856--  0  ---00
1674--  D  ---63     1735-- UP ---27      1796--STP---41       1857--  0  ---00
1675--CNT---47       1736--  1  ---01     1797--PNT---45       1858--  0  ---00
1676--  n  ---56     1737--  -  ---34     1798-- UP ---27      1859--  0  ---00
1677--  E  ---60     1738--XFR---67       1799--FMT---42       1860--  0  ---00
1678--  N  ---73     1739--  9  ---11     1800--FMT---42       1861--  0  ---00
1679--FMT---42       1740--  7  ---07     1801--XFR---67       1862--GTO---44
1680--STP---41       1741--X=Y---50       1802--  M  ---70     1863--LBL---51
1681--  K  ---55     1742--  1  ---01     1803--  I  ---65     1864--  C  ---61
1682--  2  ---02     1743--  7  ---07     1804--  N  ---73     1865--  0  ---00
1683--CLR---20       1744--  5  ---05     1805--SFL---54       1866--  0  ---00
```

```
1867--  0  ---00    1928--  0  ---00    1989--  5  ---05    1995--  0  ---00
1868--  0  ---00    1929--  0  ---00    1990--CLX---37      1996--  0  ---00
1869--  0  ---00    1930--  0  ---00    1991--  0  ---00    1997--  0  ---00
1870--  0  ---00    1931--  0  ---00    1992--FMT---42      1998--STP---41
1871--  0  ---00    1932--GTO---44      1993--  5  ---05    1999--END---46
1872--GTO---44      1933--LBL---51      1994--S/R---77
1873--LBL---51      1934--  J  ---75
1874--  D  ---63    1935--  0  ---00          Aimpoint Program - File 2
1875--  0  ---00    1936--  0  ---00
1876--  0  ---00    1937--  0  ---00    0000--LBL---51      0052--  1  ---01
1877--  0  ---00    1938--  0  ---00    0001--  0  ---71    0053--  0  ---00
1878--  0  ---00    1939--  0  ---00    0002--GTO---44      0054--  0  ---00
1879--  0  ---00    1940--  0  ---00    0003--S/R---77      0055--X=Y---50
1880--  0  ---00    1941--  0  ---00    0004--LBL---51      0056--  0  ---00
1881--  0  ---00    1942--GTO---44      0005-- YE  ---24    0057--  0  ---00
1882--GTO---44      1943--LBL---51      0006--GTO---44      0058--  6  ---06
1883--LBL---51      1944--  K  ---55    0007--S/R---77      0059--  3  ---03
1884--  E  ---60    1945--  0  ---00    0008--LBL---51      0060--GTO---44
1885--  0  ---00    1946--  0  ---00    0009--  a  ---13    0061--  3  ---03
1886--  0  ---00    1947--  0  ---00    0010--FMT---42      0062--  6  ---06
1887--  0  ---00    1948--  0  ---00    0011--FMT---42      0063--FMT---42
1888--  0  ---00    1949--  0  ---00    0012--CLR---20      0064--  1  ---01
1889--  0  ---00    1950--  0  ---00    0013--  a  ---13    0065--  8  ---10
1890--  0  ---00    1951--  0  ---00    0014--1/X---17      0066--  0  ---00
1891--  0  ---00    1952--GTO---44      0015--  N  ---73    0067--  2  ---02
1892--GTO---44      1953--LBL---51      0016--  N  ---73    0068--  0  ---00
1893--LBL---51      1954--  L  ---72    0017--  I  ---65    0069--DIV---35
1894--  F  ---16    1955--  0  ---00    0018--  N  ---73    0070--  DN ---25
1895--  0  ---00    1956--  0  ---00    0019--  G  ---15    0071--PNT---45
1896--  0  ---00    1957--  0  ---00    0020--CNT---47      0072--  C  ---61
1897--  0  ---00    1958--  0  ---00    0021--  M  ---70    0073--FMT---42
1898--  0  ---00    1959--  0  ---00    0022--  E  ---60    0074--  1  ---01
1899--  0  ---00    1960--  0  ---00    0023--  A  ---62    0075--  8  ---10
1900--  0  ---00    1961--  0  ---00    0024--  N  ---73    0076--  4  ---04
1901--  0  ---00    1962--GTO---44      0025--YTO---40      0077--PNT---45
1902--GTO---44      1963--LBL---51      0026--FMT---42      0078--  DN ---25
1903--LBL---51      1964--  M  ---70    0027--  K  ---55    0079--PNT---45
1904--  G  ---15    1965--  0  ---00    0028--  2  ---02    0080--PNT---45
1905--  0  ---00    1966--  0  ---00    0029--CLR---20      0081--FMT---42
1906--  0  ---00    1967--  0  ---00    0030--  A  ---62    0082--  5  ---05
1907--  0  ---00    1968--  0  ---00    0031--  0  ---71    0083--EEX---26
1908--  0  ---00    1969--  0  ---00    0032--  0  ---00    0084-- UP ---27
1909--  0  ---00    1970--  0  ---00    0033--XTO---23      0085--  1  ---01
1910--  0  ---00    1971--  0  ---00    0034--  a  ---13    0086--  -  ---34
1911--  0  ---00    1972--GTO---44      0035--  3  ---03    0087--XFR---67
1912--GTO---44      1973--LBL---51      0036--  1  ---01    0088--  9  ---11
1913--LBL---51      1974--  N  ---73    0037--XTO---23      0089--  7  ---07
1914--  H  ---74    1975--LBL---51      0038--  +  ---33    0090--X=Y---50
1915--  0  ---00    1976--  π  ---56    0039--  a  ---13    0091--  0  ---00
1916--  0  ---00    1977--  2  ---02    0040--GTO---44      0092--  1  ---01
1917--  0  ---00    1978--FMT---42      0041--S/R---77      0093--  0  ---00
1918--  0  ---00    1979--  5  ---05    0042--LBL---51      0094--  3  ---03
1919--  0  ---00    1980--CLX---37      0043--XSQ---12      0095--  3  ---03
1920--  0  ---00    1981--  0  ---00    0044--  0  ---71    0096--  1  ---01
1921--  0  ---00    1982--FMT---42      0045--  1  ---01    0097--FMT---42
1922--GTO---44      1983--  5  ---05    0046--XTO---23      0098--  5  ---05
1923--LBL---51      1984--S/R---77      0047--  +  ---33    0099--XFR---67
1924--  I  ---65    1985--LBL---51      0048--  b  ---14    0100--GTO---44
1925--  0  ---00    1986--  0  ---71    0049--  b  ---14    0101--  3  ---03
1926--  0  ---00    1987--  2  ---02    0050-- UP ---27     0102--  0  ---00
1927--  0  ---00    1988--FMT---42      0051--XFR---67      0103--FMT---42
```

```
0104--FMT---42    0165-- UP---27    0226--XTO---23    0287-- 2 ---02
0105--CLR---20    0166-- 1 ---01    0227-- A ---62    0288--GTO---44
0106-- C ---61    0167-- - ---34    0228--CLR---20    0289-- 2 ---02
0107-- O ---71    0168--XFR---67    0229--CNT---47    0290-- 6 ---06
0108-- M ---70    0169-- 9 ---11    0230-- A ---62    0291-- 1 ---01
0109-- π ---56    0170-- 7 ---07    0231--XSQ---12    0292--FMT---42
0110-- O ---71    0171--X=Y---50    0232--X<Y---52    0293-- 5 ---05
0111--YTO---40    0172-- 0 ---00    0233-- F ---16    0294--EEX---26
0112-- I ---65    0173-- 1 ---01    0234--XTO---23    0295-- UP---27
0113--XTO---23    0174-- 8 ---10    0235--PSE---57    0296-- 1 ---01
0114-- E ---60    0175-- 5 ---05    0236--CLR---20    0297-- - ---34
0115--CNT---47    0176-- 3 ---03    0237--CNT---47    0298--XFR---67
0116-- M ---70    0177-- 1 ---01    0238-- E ---60    0299-- 9 ---11
0117-- E ---60    0178--FMT---42    0239-- L ---72    0300-- 7 ---07
0118-- A ---62    0179-- 5 ---05    0240--X<Y---52    0301--X=Y---50
0119-- N ---73    0180--XFR---67    0241-- F ---16    0302-- 0 ---00
0120--FMT---42    0181--GTO---44    0242--XTO---23    0303-- 3 ---03
0121--CLR---20    0182-- 1 ---01    0243--PSE---57    0304-- 1 ---01
0122--XFR---67    0183-- 3 ---03    0244--CLR---20    0305-- 5 ---05
0123-- 9 ---11    0184-- 5 ---05    0245--CNT---47    0306-- 3 ---03
0124-- 6 ---06    0185-- C ---61    0246-- α ---13    0307-- 1 ---01
0125--FMT---42    0186--PNT---45    0247-- A ---62    0308--FMT---42
0126-- 5 ---05    0187-- DN---25    0248-- N ---73    0309-- 5 ---05
0127--CLX---37    0188--PNT---45    0249-- G ---15    0310--XFR---67
0128-- 3 ---03    0189--PNT---45    0250-- E ---60    0311--GTO---44
0129-- 1 ---01    0190--FMT---42    0251--X<Y---52    0312-- 2 ---02
0130--FMT---42    0191--FMT---42    0252-- N ---73    0313-- 5 ---05
0131-- 5 ---05    0192--INT---64    0253-- M ---70    0314-- 9 ---11
0132--XFR---67    0193-- A ---62    0254-- I ---65    0315--STP---41
0133-- A ---62    0194-- α ---13    0255--PSE---57    0316-- 0 ---00
0134-- O ---71    0195-- I ---65    0256--CLR---20    0317-- 0 ---00
0135--CLR---20    0196-- A ---62    0257--CLR---20    0318-- 0 ---00
0136-- 3 ---03    0197-- N ---73    0258--FMT---42    0319-- 0 ---00
0137-- 1 ---01    0198-- C ---61    0259--CLR---20    0320-- 0 ---00
0138--XTO---23    0199-- E ---60    0260-- 3 ---03    0321-- 0 ---00
0139-- + ---33    0200--FMT---42    0261-- 1 ---01    0322-- 0 ---00
0140-- α ---13    0201-- D ---63    0262--XTO---23    0323-- 0 ---00
0141--GTO---44    0202--PNT---45    0263-- + ---33    0324-- 0 ---00
0142--S/R---77    0203-- DN---25    0264-- α ---13    0325-- 0 ---00
0143--LBL---51    0204--PNT---45    0265--GTO---44    0326-- 0 ---00
0144--XSQ---12    0205--PNT---45    0266--S/R---77    0327-- 0 ---00
0145-- O ---71    0206--STP---41    0267--LBL---51    0328-- 0 ---00
0146--XFR---67    0207-- 0 ---00    0268--XSQ---12    0329-- 0 ---00
0147-- 1 ---01    0208-- 0 ---00    0269-- O ---71    0330-- 0 ---00
0148-- 0 ---00    0209-- 0 ---00    0270--PNT---45    0331-- 0 ---00
0149-- 0 ---00    0210--LBL---51    0271-- DN---25    0332-- 0 ---00
0150-- UP---27    0211-- π ---56    0272--PNT---45    0333-- 0 ---00
0151--XFR---67    0212--GTO---44    0273-- DN---25    0334-- 0 ---00
0152-- 0 ---00    0213--S/R---77    0274--PNT---45    0335-- 0 ---00
0153--X=Y---50    0214--LBL---51    0275--PNT---45    0336-- 0 ---00
0154-- 0 ---00    0215-- YE---24    0276--XFR---67    0337-- 0 ---00
0155-- 1 ---01    0216--GTO---44    0277-- 1 ---01    0338-- 0 ---00
0156-- 6 ---06    0217--S/R---77    0278-- 0 ---00    0339-- 0 ---00
0157-- 2 ---02    0218--LBL---51    0279-- 0 ---00    0340-- 0 ---00
0158--GTO---44    0219-- α ---13    0280-- UP---27    0341-- 0 ---00
0159-- 1 ---01    0220-- A ---62    0281--XFR---67    0342-- 0 ---00
0160-- 3 ---03    0221-- O ---71    0282-- 0 ---00    0343-- 0 ---00
0161-- 7 ---07    0222--FMT---42    0283--X=Y---50    0344-- 0 ---00
0162--FMT---42    0223--FMT---42    0284-- 0 ---00    0345-- 0 ---00
0163-- 5 ---05    0224-- D ---63    0285-- 2 ---02    0346-- 0 ---00
0164--EEX---26    0225-- A ---62    0286-- 9 ---11    0347-- 0 ---00
```

| | | | |
|---|---|---|---|
| 0348-- 0 ---00 | 0409--XTO---23 | 0470-- 1 ---01 | 0531-- 0 ---00 |
| 0349-- 0 ---00 | 0410--CNT---47 | 0471--XTO---23 | 0532-- 0 ---00 |
| 0350-- 0 ---00 | 0411-- D ---63 | 0472-- + ---33 | 0533-- 0 ---00 |
| 0351-- 0 ---00 | 0412-- A ---62 | 0473-- α ---13 | 0534-- 0 ---00 |
| 0352-- 0 ---00 | 0413--XTO---23 | 0474--XFR---67 | 0535-- 0 ---00 |
| 0353-- 0 ---00 | 0414-- A ---62 | 0475--IND---31 | 0536-- 0 ---00 |
| 0354-- 0 ---00 | 0415--CNT---47 | 0476-- α ---13 | 0537-- 0 ---00 |
| 0355-- 0 ---00 | 0416-- F ---16 | 0477-- X ---36 | 0538-- 0 ---00 |
| 0356-- 0 ---00 | 0417-- I ---65 | 0478--RUP---22 | 0539-- 0 ---00 |
| 0357-- 0 ---00 | 0418-- L ---72 | 0479--XEY---30 | 0540-- 0 ---00 |
| 0358-- 0 ---00 | 0419-- E ---60 | 0480-- X ---36 | 0541-- 0 ---00 |
| 0359-- 0 ---00 | 0420--CLR---20 | 0481--RUP---22 | 0542-- 0 ---00 |
| 0360-- 0 ---00 | 0421-- N ---73 | 0482--RUP---22 | 0543-- 0 ---00 |
| 0361-- 0 ---00 | 0422-- O ---71 | 0483--S/R---77 | 0544-- 0 ---00 |
| 0362-- 0 ---00 | 0423-- . ---21 | 0484-- 0 ---00 | 0545-- 0 ---00 |
| 0363-- 0 ---00 | 0424--SFL---54 | 0485--LBL---51 | 0546-- 0 ---00 |
| 0364-- 0 ---00 | 0425--IFG---43 | 0486-- α ---13 | 0547-- 0 ---00 |
| 0365-- 0 ---00 | 0426--FMT---42 | 0487--FMT---42 | 0548-- 0 ---00 |
| 0366-- 0 ---00 | 0427--STP---41 | 0488-- 1 ---01 | 0549-- 0 ---00 |
| 0367-- 0 ---00 | 0428--PNT---45 | 0489-- 8 ---10 | 0550--LBL---51 |
| 0368-- 0 ---00 | 0429--FMT---42 | 0490-- 0 ---00 | 0551--YTO---40 |
| 0369-- 0 ---00 | 0430-- 5 ---05 | 0491--FMT---42 | 0552--FMT---42 |
| 0370-- 0 ---00 | 0431--CLX---37 | 0492--FMT---42 | 0553--FMT---42 |
| 0371-- 0 ---00 | 0432-- 3 ---03 | 0493--CLR---20 | 0554-- E ---60 |
| 0372-- 0 ---00 | 0433-- 1 ---01 | 0494--CLR---20 | 0555-- N ---73 |
| 0373-- 0 ---00 | 0434--FMT---42 | 0495-- O ---71 | 0556--XTO---23 |
| 0374-- 0 ---00 | 0435-- 5 ---05 | 0496-- n ---56 | 0557-- E ---60 |
| 0375-- 0 ---00 | 0436--XFR---67 | 0497--FMT---42 | 0558-- α ---13 |
| 0376-- 0 ---00 | 0437--S/R---77 | 0498--XFR---67 | 0559--CNT---47 |
| 0377-- 0 ---00 | 0438-- 0 ---00 | 0499-- 9 ---11 | 0560-- M ---70 |
| 0378-- 0 ---00 | 0439-- 0 ---00 | 0500-- 4 ---04 | 0561--1/X---17 |
| 0379-- 0 ---00 | 0440--LBL---51 | 0501--PNT---45 | 0562-- L ---72 |
| 0380-- 0 ---00 | 0441--XSQ---12 | 0502--FMT---42 | 0563--XTO---23 |
| 0381-- 0 ---00 | 0442-- 6 ---06 | 0503--FMT---42 | 0564-- 1 ---65 |
| 0382-- 0 ---00 | 0443-- 0 ---00 | 0504-- α ---13 | 0565-- n ---56 |
| 0383-- 0 ---00 | 0444-- 7 ---07 | 0505--1/X---17 | 0566-- L ---72 |
| 0384-- 0 ---00 | 0445-- 6 ---06 | 0506-- N ---73 | 0567--XFR---67 |
| 0385-- 0 ---00 | 0446-- UP---27 | 0507--FMT---42 | 0568-- N ---73 |
| 0386-- 0 ---00 | 0447-- n ---56 | 0508--XFR---67 | 0569-- G ---15 |
| 0387-- 0 ---00 | 0448-- X ---36 | 0509-- 9 ---11 | 0570-- F ---16 |
| 0388-- 0 ---00 | 0449-- 1 ---01 | 0510-- 5 ---05 | 0571-- A ---62 |
| 0389-- 0 ---00 | 0450-- 8 ---10 | 0511--PNT---45 | 0572-- C ---61 |
| 0390-- 0 ---00 | 0451-- 0 ---00 | 0512--FMT---42 | 0573--XTO---23 |
| 0391-- 0 ---00 | 0452--DIV---35 | 0513-- 1 ---01 | 0574-- O ---71 |
| 0392-- 0 ---00 | 0453-- DN---25 | 0514-- 8 ---10 | 0575-- α ---13 |
| 0393-- 0 ---00 | 0454-- UP---27 | 0515-- 3 ---03 | 0576--YTO---40 |
| 0394-- 0 ---00 | 0455-- UP---27 | 0516--S/R---77 | 0577--CLR---20 |
| 0395-- 0 ---00 | 0456--XFR---67 | 0517-- 0 ---00 | 0578--CNT---47 |
| 0396-- 0 ---00 | 0457--IND---31 | 0518-- 0 ---00 | 0579-- YE---24 |
| 0397-- 0 ---00 | 0458-- X ---36 | 0519-- 0 ---00 | 0580-- G ---15 |
| 0398-- 0 ---00 | 0459-- α ---13 | 0520-- 0 ---00 | 0581-- A ---62 |
| 0399-- 0 ---00 | 0460--RUP---22 | 0521-- 0 ---00 | 0582-- I ---65 |
| 0400--LBL---51 | 0461-- 1 ---01 | 0522-- 0 ---00 | 0583-- N ---73 |
| 0401-- YE---24 | 0462--XTO---23 | 0523-- 0 ---00 | 0584--SFL---54 |
| 0402--FMT---42 | 0463-- + ---33 | 0524-- 0 ---00 | 0585--IFG---43 |
| 0403--FMT---42 | 0464-- α ---13 | 0525-- 0 ---00 | 0586--FMT---42 |
| 0404--CLR---20 | 0465--XFR---67 | 0526-- 0 ---00 | 0587--STP---41 |
| 0405-- F ---16 | 0466--IND---31 | 0527-- 0 ---00 | 0588--PNT---45 |
| 0406-- 1 ---65 | 0467-- α ---13 | 0528-- 0 ---00 | 0589--XTO---23 |
| 0407-- α ---13 | 0468--RUP---22 | 0529-- 0 ---00 | 0590-- 6 ---06 |
| 0408--YTO---40 | 0469-- X ---36 | 0530-- 0 ---00 | 0591--FMT---42 |

```
0592--FMT---42    0653-- E ---60    0714--LBL---51    0775-- 0 ---00
0593--CNT---47    0654--XTO---23    0715-- YE---24    0776-- 0 ---00
0594--XFR---67    0655--X<Y---52    0716-- K ---55    0777-- UP---27
0595-- G ---15    0656-- D ---63    0717-- 2 ---02    0778--XFR---67
0596-- A ---62    0657-- E ---60    0718-- A ---62    0779-- 0 ---00
0597-- I ---65    0658-- G ---15    0719-- 0 ---71    0780--X=Y---50
0598-- N ---73    0659--PSE---57    0720--CLR---20    0781-- 0 ---00
0599--SFL---54    0660--SFL---54    0721-- 3 ---03    0782-- 7 ---07
0600--IFG---43    0661--IFG---43    0722-- 1 ---01    0783-- 8 ---10
0601--FMT---42    0662--FMT---42    0723--XTO---23    0784-- 9 ---11
0602--STP---41    0663--STP---41    0724-- + ---33    0785--GTO---44
0603--PNT---45    0664--PNT---45    0725-- α ---13    0786-- 7 ---07
0604--XTO---23    0665--XTO---23    0726--XFR---67    0787-- 2 ---02
0605-- 7 ---07    0666-- 9 ---11    0727-- 6 ---06    0788-- 2 ---02
0606--FMT---42    0667--FMT---42    0728--XTO---23    0789--FMT---42
0607--FMT---42    0668--FMT---42    0729-- X ---36    0790-- 5 ---05
0608--CNT---47    0669--CNT---47    0730--IND---31    0791-- Γ ---76
0609-- α ---13    0670--XFR---67    0731-- α ---13    0792-- 7 ---07
0610-- G ---15    0671-- 0 ---71    0732--XFR---67    0793-- 8 ---10
0611-- A ---62    0672-- F ---16    0733-- 9 ---11    0794-- UP---27
0612-- I ---65    0673-- F ---16    0734--XTO---23    0795-- 3 ---03
0613-- N ---73    0674--YTO---40    0735-- + ---33    0796-- 1 ---01
0614--SFL---54    0675-- E ---60    0736--IND---31    0797--FMT---42
0615--IFG---43    0676--XTO---23    0737-- α ---13    0798-- 5 ---05
0616--FMT---42    0677--X<Y---52    0738-- 1 ---01    0799--XTO---23
0617--STP---41    0678-- D ---63    0739--XTO---23    0800--FMT---42
0618--PNT---45    0679-- E ---60    0740-- + ---33    0801-- 5 ---05
0619--XTO---23    0680-- G ---15    0741-- α ---13    0802--EEX---26
0620-- 8 ---10    0681--PSE---57    0742--XFR---67    0803-- UP---27
0621--FMT---42    0682--SFL---54    0743-- 7 ---07    0804-- 1 ---01
0622--FMT---42    0683--IFG---43    0744--XTO---23    0805-- - ---34
0623--CLR---20    0684--FMT---42    0745-- X ---36    0806--XFR---67
0624-- E ---60    0685--STP---41    0746--IND---31    0807-- 9 ---11
0625-- N ---73    0686--PNT---45    0747-- α ---13    0808-- 7 ---07
0626--XTO---23    0687--XTO---23    0748--XFR---67    0809--X=Y---50
0627-- E ---60    0688-- 1 ---01    0749-- 1 ---01    0810-- 0 ---00
0628-- α ---13    0689-- 0 ---00    0750-- 0 ---00    0811-- 8 ---10
0629--CNT---47    0690--FMT---42    0751--XTO---23    0812-- 2 ---02
0630-- A ---62    0691--FMT---42    0752-- + ---33    0813-- 3 ---03
0631-- D ---63    0692--CNT---47    0753--IND---31    0814-- 3 ---03
0632-- D ---63    0693-- α ---13    0754-- α ---13    0815-- 1 ---01
0633-- I ---65    0694-- 0 ---71    0755-- 1 ---01    0816--FMT---42
0634--XTO---23    0695-- F ---16    0756--XTO---23    0817-- 5 ---05
0635-- I ---65    0696-- F ---16    0757-- + ---33    0818--XFR---67
0636-- 0 ---71    0697--YTO---40    0758-- α ---13    0819--GTO---44
0637-- N ---73    0698-- E ---60    0759--XFR---67    0820-- 7 ---07
0638--CLR---20    0699--XTO---23    0760-- 8 ---10    0821-- 2 ---02
0639-- F ---16    0700--X<Y---52    0761--XTO---23    0822-- 0 ---00
0640-- A ---62    0701-- F ---16    0762-- X ---36    0823--FMT---42
0641-- C ---61    0702--XTO---23    0763--IND---31    0824--FMT---42
0642--XTO---23    0703--PSE---57    0764-- α ---13    0825--CLR---20
0643-- 0 ---71    0704--SFL---54    0765--XFR---67    0826-- D ---63
0644-- α ---13    0705--IFG---43    0766-- 1 ---01    0827-- 0 ---71
0645--YTO---40    0706--FMT---42    0767-- 1 ---01    0828-- N ---73
0646--CLR---20    0707--STP---41    0768--XTO---23    0829-- E ---60
0647--CNT---47    0708--PNT---45    0769-- + ---33    0830--FMT---42
0648-- YE---24    0709--XTO---23    0770--IND---31    0831--STP---41
0649-- 0 ---71    0710-- 1 ---01    0771-- α ---13    0832-- 0 ---00
0650-- F ---16    0711-- 1 ---01    0772-- 0 ---71    0833-- 0 ---00
0651-- F ---16    0712--GTO---44    0773--XFR---67    0834-- 0 ---00
0652--YTO---40    0713--S/R---77    0774-- 1 ---01    0835-- 0 ---00
```

```
0836-- 0 ---00     1840-- 5 ---05     1900-- 5 ---05     1950-- 5 ---05
0837-- 0 ---00     1841--S/R---77     1901--S/R---77     1951--S/R---77
0838-- 0 ---00     1842--LBL---51     1902--LBL---51     1952--LBL---51
0839-- 0 ---00     1843-- B ---66     1903-- H ---74     1953-- M ---70
0840-- 0 ---00     1844-- 1 ---01     1904-- 1 ---01     1954-- 1 ---01
0841-- 0 ---00     1845--FMT---42     1905--FMT---42     1955--FMT---42
0842-- 0 ---00     1846-- 5 ---05     1906-- 5 ---05     1956-- 5 ---05
0843-- 0 ---00     1847--CLX---37     1907--CLX---37     1957--CLX---37
0844-- 0 ---00     1848-- 0 ---00     1908-- 0 ---00     1958-- 0 ---00
0845-- 0 ---00     1849--FMT---42     1909--FMT---42     1959--FMT---42
0846-- 0 ---00     1850-- 5 ---05     1910-- 5 ---05     1960-- 5 ---05
0847-- 0 ---00     1851--S/R---77     1911--S/R---77     1961--S/R---77
0848-- 0 ---00     1852--LBL---51     1912--LBL---51     1962--LBL---51
0849-- 0 ---00     1853-- C ---61     1913-- I ---65     1963-- N ---73
0850-- 0 ---00     1854-- 1 ---01     1914-- 1 ---01     1964-- 1 ---01
0851-- 0 ---00     1855--FMT---42     1915--FMT---42     1965--FMT---42
0852-- 0 ---00     1856-- 5 ---05     1916-- 5 ---05     1966-- 5 ---05
0853-- 0 ---00     1857--CLX---37     1917--CLX---37     1967--CLX---37
0854-- 0 ---00     1858-- 0 ---00     1918-- 0 ---00     1968-- 0 ---00
0855-- 0 ---00     1859--FMT---42     1919--FMT---42     1969--FMT---42
1800-- 0 ---00     1860-- 5 ---05     1920-- 5 ---05     1970-- 5 ---05
1801-- 0 ---00     1861--S/R---77     1921--S/R---77     1971--S/R---77
1802-- 0 ---00     1862--LBL---51     1922--LBL---51     1972-- 0 ---00
1803-- 0 ---00     1863-- D ---63     1923-- J ---75     1973-- 0 ---00
1804-- 0 ---00     1864-- 1 ---01     1924-- 1 ---01     1974-- 0 ---00
1805-- 0 ---00     1865--FMT---42     1925--FMT---42     1975-- 0 ---00
1806-- 0 ---00     1866-- 5 ---05     1926-- 5 ---05     1976-- 0 ---00
1807-- 0 ---00     1867--CLX---37     1927--CLX---37     1977-- 0 ---00
1808-- 0 ---00     1868-- 0 ---00     1928-- 0 ---00     1978-- 0 ---00
1809-- 0 ---00     1869--FMT---42     1929--FMT---42     1979-- 0 ---00
1810-- 0 ---00     1870-- 5 ---05     1930-- 5 ---05     1980-- 0 ---00
1811-- 0 ---00     1871--S/R---77     1931--S/R---77     1981-- 0 ---00
1812-- 0 ---00     1872--LBL---51     1932--LBL---51     1982-- 0 ---00
1813-- 0 ---00     1873-- E ---60     1933-- K ---55     1983-- 0 ---00
1814-- 0 ---00     1874-- 1 ---01     1934-- 1 ---01     1984-- 0 ---00
1815-- 0 ---00     1875--FMT---42     1935--FMT---42     1985--GTO---44
1816-- 0 ---00     1876-- 5 ---05     1936-- 5 ---05     1986--LBL---51
1817-- 0 ---00     1877--CLX---37     1937--CLX---37     1987-- π ---56
1818-- 0 ---00     1878-- 0 ---00     1938-- 0 ---00     1988-- 0 ---00
1819-- 0 ---00     1879--FMT---42     1939--FMT---42     1989-- 0 ---00
1820-- 0 ---00     1880-- 5 ---05     1940-- 5 ---05     1990-- 0 ---00
1821-- 0 ---00     1881--S/R---77     1941--S/R---77     1991-- 0 ---00
1822-- 0 ---00     1882--LBL---51     1942--LBL---51     1992-- 0 ---00
1823-- 0 ---00     1883-- F ---16     1943-- L ---72     1993-- 0 ---00
1824-- 0 ---00     1884-- 1 ---01     1944-- 1 ---01     1994-- 0 ---00
1825-- 0 ---00     1885--FMT---42     1945--FMT---42     1995--GTO---44
1826-- 0 ---00     1886-- 5 ---05     1946-- 5 ---05     1996--LBL---51
1827-- 0 ---00     1887--CLX---37     1947--CLX---37     1997-- 0 ---71
1828-- 0 ---00     1888-- 0 ---00     1948-- 0 ---00     1998-- 0 ---00
1829--GTO---44     1889--FMT---42     1949--FMT---42     1999--END---46
1830--LBL---51     1890-- 5 ---05
1831--YTO---40     1891--S/R---77
1832--LBL---51     1892--LBL---51
1833-- A ---62     1893-- G ---15
1834-- 1 ---01     1894-- 1 ---01
1835--FMT---42     1895--FMT---42
1836-- 5 ---05     1896-- 5 ---05
1837--CLX---37     1897--CLX---37
1838-- 0 ---00     1898-- 0 ---00
1839--FMT---42     1899--FMT---42
```

APPENDIX B
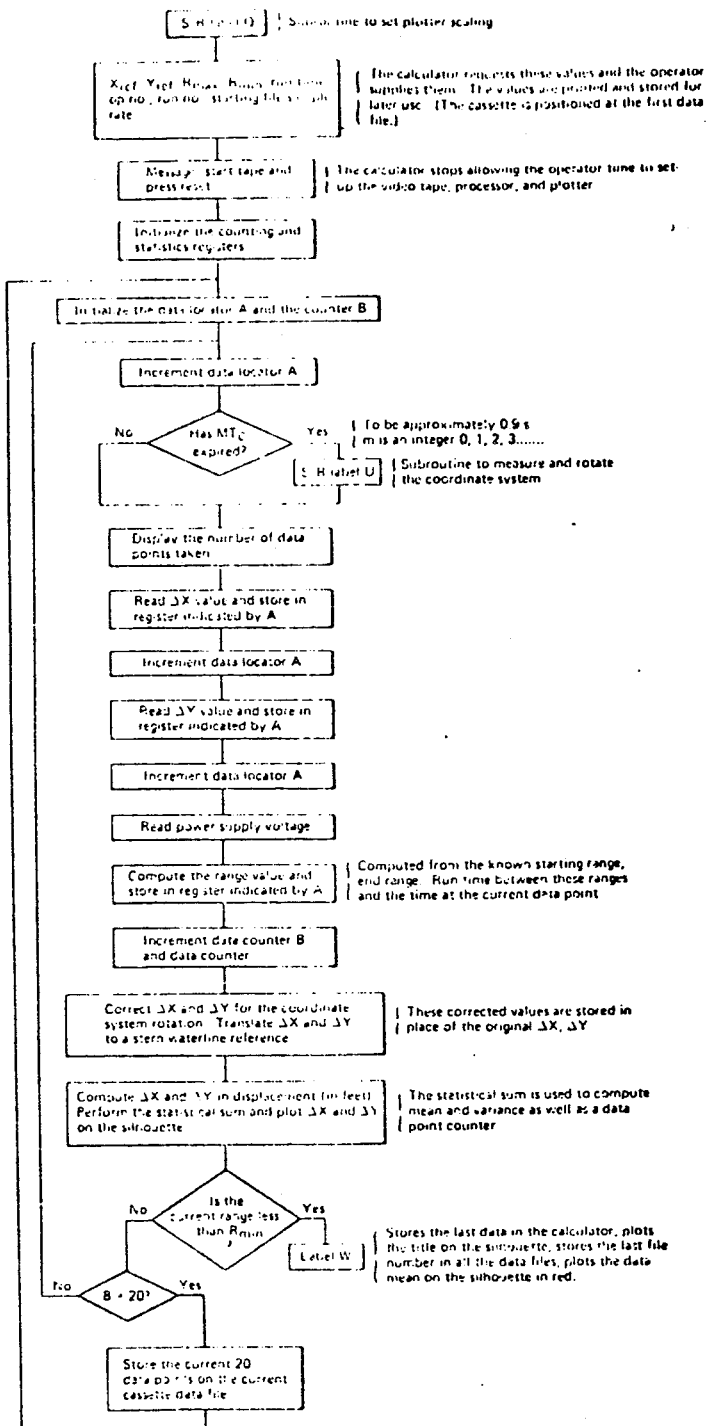
Label A Program Segment (Reads data and plots on target silouette)

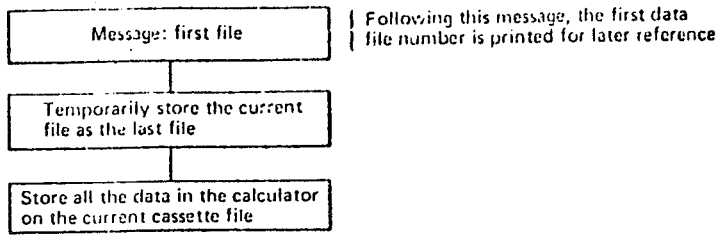
APPENDIX C
Label B Program Segment (to interrupt a run)
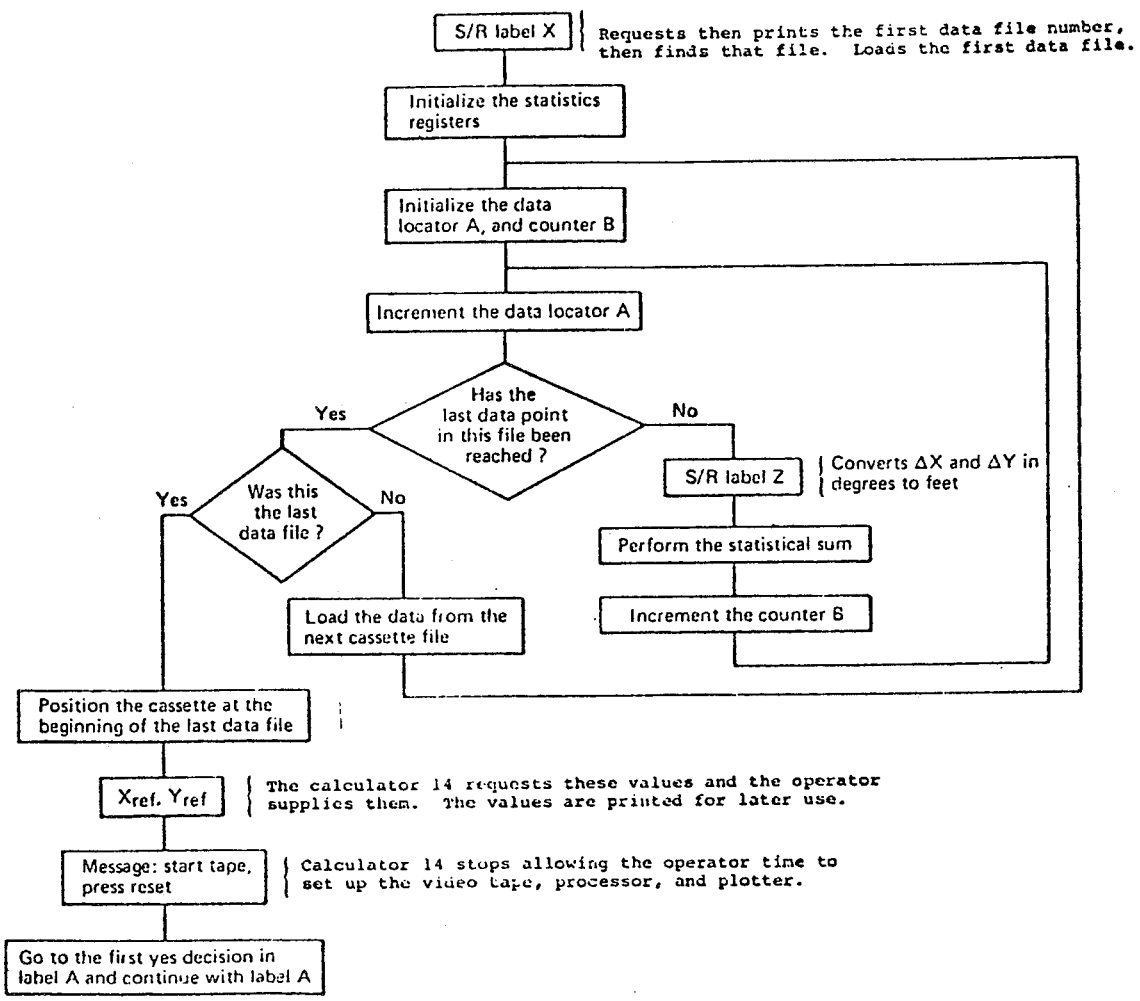
Label B and C Flow Diagrams

What is claimed is:

1. Apparatus for quantizing target tracking data from a stored video representation of a dynamic target tracking operation scenario wherein the target being tracked is depicted with a tracking symbol superimposed thereon indicating the aimpoint for the target tracking system, said apparatus comprising in combination:

display means responsive to said stored video representation for displaying said target tracking scenario on a frame by frame basis, means for demarcating on a frame by frame basis the respective locations of said tracking symbol and a preselected reference point on the target, said location demarcating means comprising means controllable by an operator to position independently first and second display symbols at said target tracking symbol location and said target reference point location respectively, for each display frame, and producing a pair of output signals representing respectively the linear (x, y) coordinates of each of said target tracking symbol location and said target reference point location, means responsive to the angular separation on said video representation between said tracking symbol location and said target reference point location, as represented by the pair of output signals produced by said location demarcating means, for converting said angular separation into linear (x, y) displacement data coordinates for each frame of said target tracking scenario, and means for storing said linear (x, y) displacement data coordinates for each frame of said target tracking scenario.

2. The apparatus specified in claim 1 wherein the field of view of said target tracking system is subject to angular displacement relative to said target and further including means for compensating said linear (x, y) displacement data coodinates for said angular displacement.

3. The apparatus specified in claim 1 further including plotter means responsive to said linear (x, y) displacement data coordinates for each frame of said target tracking scenario for plotting said data coordinates on a target silhouette to produce a pictorial representation of the distribution of said data coordinates on said target silhouette during said target tracking operation.

4. The apparatus specified in claim 1 wherein said stored video representation is input on video tape, said display means is a video monitor for displaying said target tracking scenario from said input video tape, and said location demarcating means includes means for generating first and second display symbols for display on said video monitor and joystick controller means positionable by the operator to position independently said first and second display symbols on said video monitor display at said target tracking symbol location and said target reference point location respectively.

5. The apparatus specified in claim 4 wherein said means for converting the angular separation between said target tracking symbol location and said target reference point location into linear (x, y) displacement data coordinates location into linear (x, y) displacement data coordinates comprises a programmable calculator means responsive to position voltage signals generated by said joystick controller means proportionate to the corresponding angular $\Delta X$, $\Delta Y$ displacements between said target tracking symbol and target reference point locations.

6. The apparatus specified in claim 5 wherein said calculator is programmed to multiply the $\Delta X$, $\Delta Y$ angular displacements each by the target range $R_n$ computed in accordance with the equation:

$$R_n = R_{max} - \frac{n(R_{max} - R_{min})}{ST},$$

where
    $R_{max}$ is the run starting range (in feet),
    $R_{min}$ is the run ending range (in feet),
    T is the run duration (in seconds),
    S is the sample rate (in samples/second), and
    n is the sample number.

7. The apparatus specified in claim 5 further comprising an alphanumeric display means connected to said programmable calculator means.

8. The apparatus specified in claim 7 wherein said programmable calculator means is programmed to generate instructional messages for display to the operator on said alphanumeric display means instructing the operator through the operational sequence of positioning said first and second display symbols, and reading the corresponding angular $\Delta X$, $\Delta Y$ displacements into said programmable calculator on a frame by frame basis.

9. The apparatus specified in claim 5 wherein said calculator means is programmed to be interactive with the operator to compensate for angular displacement of the tracking system field of view relative to said target, said programmable calculator generating instructional messages to instruct the operator to input to said calculator $\Delta X$, $\Delta Y$ values proportional to the angular displacement between a selected horizon of the displayed target tracking scenario and a display reference horizon, said calculator being programmed to compute the rotated coordinates $\Delta X'$, $\Delta Y'$ of this display scenario according to the equations $$\sin \alpha = \Delta Y/\Delta X^2 + \Delta Y^2 \text{ and } \cos \alpha \Delta X/\Delta X^2 + \Delta Y^2$$

where $\alpha$ is the rotation angle, and $$\Delta X' = \Delta X \cos \alpha + \Delta Y \sin \alpha, \text{ and}$$

$$\Delta Y' = \Delta Y \cos \alpha - \Delta X \sin \alpha, \text{ and}$$

said calculator being further programmed to perform a coordinate rotation of the angular $\Delta X$, $\Delta Y$ displacements between said target tracking symbol and target reference point locations, in accordance with the computed values of $\Delta X'$, $\Delta Y'$, prior to conversion of the angular $\Delta X$, $\Delta Y$ displacements between said target tracking symbol and target reference point locations into said linear (X, Y) displacement data coordinates.

* * * * *